United States Patent
Hauspy et al.

(10) Patent No.: US 12,340,401 B2
(45) Date of Patent: *Jun. 24, 2025

(54) SMART SHOPPING AND INFORMATION COLLECTION BY NATURAL GESTURE USING UWB

(71) Applicant: Apple Inc., Cupertino, CA (US)

(72) Inventors: Tom Bert Etienne Hauspy, Jetzendorf (DE); Biljana Badic, Munich (DE); Christian Drewes, Germering (DE); Christian W. Mucke, Bad Hofgastein (AT)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,144

(22) Filed: Feb. 27, 2024

(65) Prior Publication Data

US 2024/0202787 A1  Jun. 20, 2024

Related U.S. Application Data

(63) Continuation of application No. 17/337,783, filed on Jun. 3, 2021, now Pat. No. 11,922,473.

(51) Int. Cl.
*G06Q 30/00* (2023.01)
*G06N 20/00* (2019.01)
*G06Q 20/32* (2012.01)
*G06Q 30/0601* (2023.01)

(52) U.S. Cl.
CPC ......... *G06Q 30/0601* (2013.01); *G06N 20/00* (2019.01); *G06Q 20/321* (2020.05)

(58) Field of Classification Search
CPC .............................. G06Q 30/06–08
See application file for complete search history.

(56) References Cited

U.S. PATENT DOCUMENTS

| | | | |
|---|---|---|---|
| 9,870,057 B1 | 1/2018 | Want et al. | |
| 10,290,031 B2* | 5/2019 | Reid | A61B 5/117 |
| 10,685,488 B1 | 6/2020 | Kumar | |
| 10,706,451 B2 | 7/2020 | Xiao | |
| 11,328,334 B1 | 5/2022 | Ethington | |
| 11,922,473 B2* | 3/2024 | Hauspy | G06N 20/00 |
| 2017/0116664 A1* | 4/2017 | Lee | G06Q 30/0639 |
| 2020/0198581 A1* | 6/2020 | Ette | B60R 25/31 |
| 2021/0160709 A1 | 5/2021 | Marumo et al. | |

* cited by examiner

*Primary Examiner* — Ethan D Civan
(74) *Attorney, Agent, or Firm* — FLETCHER YODER PC

(57) ABSTRACT

Smart gesturing may facilitate smart shopping and other contactless experiences by enabling a user to perform a natural gesture toward one or more desired items with or while wearing a wearable or non-wearable electronic device. The electronic device may identify the smart gesture, and determine the one or more desired items are indicated by the smart gesture. The electronic device may identify the desired items by receiving location data of multiple items, determining a vector based on a first position a second position of the smart gesture, extending the vector to a location, and using the location data to determine which item or items correspond to the location. If more than one item is indicated by the smart gesture, the electronic device may enable selection of the items and, if at least one item is selected, provide information on the selected items or enable additional interaction with the selected items.

20 Claims, 13 Drawing Sheets

SMART SHOPPING AND INFORMATION COLLECTION BY NATURAL GESTURE USING UWB

CROSS-REFERENCE TO RELATED APPLICATIONS

This application is a continuation of U.S. patent application Ser. No. 17/337,783, filed Jun. 3, 2021, entitled "Smart Shopping And Information Collection By Natural Gesture Using UWB," which is incorporated by reference herein in its entirety for all purposes.

BACKGROUND

The disclosure relates generally to providing a smart shopping experience using wireless communication. Smart shopping may be implemented using a device (e.g., a kiosk, a mobile device owned by a patron on which a retailer's software is installed) that enables adding desired items or objects to a checkout list. However, the device may lead to inefficiencies in the smart shopping experience, such as contact by and reuse of the device by multiple patrons (thus providing a transmission point of diseases that may be spread by contact), lines forming to use the device, crowd-building, or other undesirable conditions that may disrupt the smart shopping experience.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device may receive, via receiving circuitry, location data of multiple items. The electronic device may receive an indication of a smart gesture. The electronic device may determine that the smart gesture indicates one or more target items of the multiple items and, in response to determining that the smart gesture indicates the one or more target items, the electronic device may perform an action based on the one or more target items.

In another embodiment, an electronic device may include receive circuitry that may receive location data of an item. The electronic device may also include ultra-wideband receive circuitry that may receive a first position and a second position of the electronic device. Additionally, the electronic device may have one or more motion sensors that may provide an indication that a smart gesture is performed with the electronic device. The electronic device may also have processing circuitry which may determine the smart gesture based on the indication from the one or more motion sensors. The processing circuitry may, in response to determining that the smart gesture is performed, determine the item based on the first position and the second position of the electronic device from the ultra-wideband receive circuitry. Further, the processing circuitry may, in response to determining that the smart gesture indicates the item, perform an action based on the item.

In yet another embodiment, a tangible, non-transitory, computer-readable medium, including computer-readable instructions that, upon execution by one or more processors of an electronic device, cause the one or more processors to receive, via a receiver of the electronic device, identification data for multiple items. The one or more processors may also receive, via the one or more motion sensors of the electronic device, motion data of the electronic device. The one or more processors may determine, based on the motion data, a smart gesture and, in response to determining the smart gesture, receive, via an ultra-wideband receiver of the electronic device, a beacon signal from an ultra-wideband beacon. The one or more processors may then determine, based on the beacon signal and the identification data, an item of the multiple items. Further, the one or more processors may, in response to determining the item of the multiple items, perform an action based on the item.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
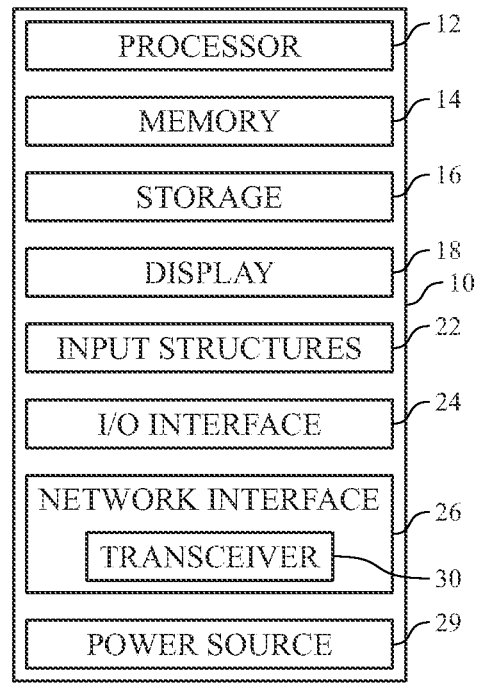
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Smart shopping may enable a user (e.g., patron, customer, shopper) to select, obtain information on, and/or purchase a variety of items without the need for the user to come into contact with the item. For example, a smart shopping-enabled business may utilize electronic devices, such as a kiosk or a mobile electronic device associated with a retailer or a user on which the retailer's software application is installed, to select an item, show the item (e.g., clothing) on the user, show the item (e.g., a household item) in the user's domicile, obtain information on the item, purchase the item, and so on. However, there may be inefficiencies that disrupt the smart shopping experience. For example, the kiosk or the software application may have an unintuitive interface (e.g., multiple menus, unintuitive navigation through the retailer's items, and so on) that causes a user difficulty to select an item, which may lead to a line forming at the kiosk or crowd-building from users attempting to select the item on their mobile devices. Moreover, contact by and reuse of the kiosk or the retailer's mobile device by multiple patrons may provide a transmission point of diseases that may be spread by contact.

Embodiments herein provide various techniques to reduce or avoid undesirable conditions of the smart shopping experience (e.g., line formation, crowd-building, multiple users touching a single device), thus increasing the efficiency and ease of the smart shopping experience. To do so, the disclosed embodiments may enable a user to select, obtain information on, and purchase a desired item by gesturing towards the item. A gesture intended to identify or interact with a target item via an electronic device may be referred to herein as a "smart gesture." The electronic device may include a non-wearable electronic device (e.g., a smartphone), a wearable electronic device (e.g., a smart ring, a smart watch, smart glasses, earbuds, headphones, and so on), a camera system that detects and identifies the smart gesture, and so on. By enabling a user to choose a desired item by gesturing towards the item with any one of a number of natural, culturally pertinent hand, arm, and/or head gestures, the smart shopping experience may be simplified and streamlined-decreasing, or avoiding altogether, formation of long waiting lines and crowd building. A variety of measures may be taken to enhance accuracy of the smart gesture and the item targeted by the smart gesture. For example, an electronic device may be equipped with one or more motion sensors that may detect a variety of movements (e.g., upward, downward, outward, inward, twisting, turning, and/or other similar motions) that may indicate a smart gesture, and processing circuitry of the electronic device may determine whether the movements form the smart gesture. In some embodiments, a baseline for a specific user gesture may be established by a series of calibration movements that may be detected by the motion sensors. Additionally, the electronic device may include a machine learning engine that may learn and enable more accurate gesture identification.

UWB-enabled electronic devices may enable fine-granularity smart gesturing via communication with a UWB anchor or a UWB beacon. For example, a UWB transmitter or UWB transceiver of the electronic device may ping (e.g. send a request packet to) one or more UWB anchors to determine the location of the electronic device within a smart gesture-enabled premises (e.g., restaurant, retail store, grocery store, and so on) to an accuracy of up to 5 centimeters. When the user directs a smart gesture at a desired item, the electronic device may establish a vector based on the smart gesture to determine the desired item. In the UWB beacon use case, the beacon may be associated with a certain item available for purchase. When the user gestures to a desired item associated with a UWB beacon, and the electronic device is within a threshold range of the UWB beacon, the electronic device may receive a beacon signal from the UWB beacon, associated with or indicating the desired item. Smart gesturing may also be facilitated by 5th generation (5G) cellular network slicing, wherein a smart gesture-enabled premises may have a virtualized 5G network dedicated to supporting smart gesture operation.

With the foregoing in mind, FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop computer, a notebook computer, a portable electronic or handheld electronic device (e.g., a wireless electronic device or smartphone), a tablet, a wearable electronic device, and other similar devices. It should be noted that the processor 12 and other related items in FIG. 1 may be generally referred to herein as "data processing circuitry." Such data processing circuitry may be embodied wholly or in part as software, hardware, or a combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level) and/or include sensors that detect or measure physical properties, and/or record, indicate, or otherwise respond to the physical properties. The I/O interface 24 may enable electronic device 10 to interface with various other electronic devices, as may the network interface 26. The network interface 26 may include, for example, one or more interfaces for a personal area network (PAN), such as an ultra-wideband (UWB) network and/or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, and/or for a non-terrestrial network, such as a satellite communication network. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas. The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
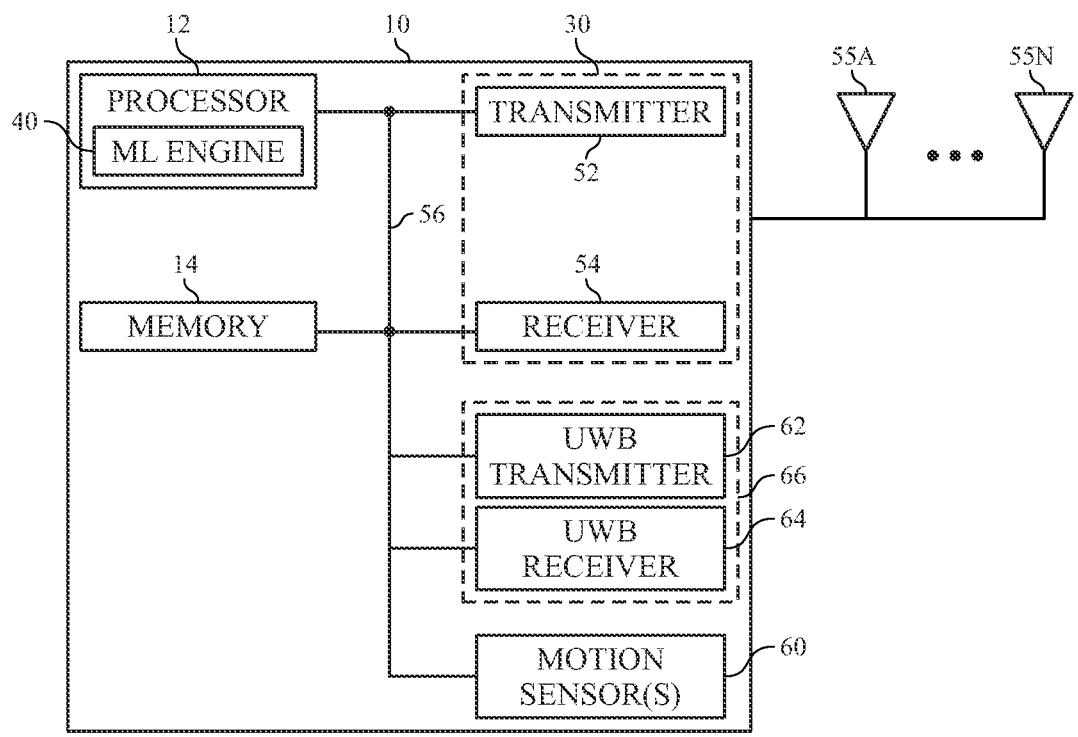
FIG. 2 is a functional block diagram of the electronic device of FIG. 1, according to embodiments of the present disclosure.

FIG. 2 is a functional diagram of the electronic device 10 of FIG. 1, according to embodiments of the present disclosure. As illustrated, the electronic device 10 may include multiple transceivers, such as a first transceiver 30 (having the transmitter 52 and/or the receiver 54) for cellular communication, and a second transceiver 66 (having a transmitter 62 and/or a receiver 64) for UWB communication. In some embodiments, the transceivers 30, 66 may be combined in a single transceiver, the transmitters 52, 62 may be combined in a single transmitter, and the receivers 54, 64 may be combined in a single receiver. Additionally, the input structures 22 of the electronic device 10 may include one or more motion sensors 60 that detect motion, orientation, movement, acceleration, and so on, of the electronic device 10. As illustrated, the processor 12, the memory 14, the power source 29, the transceiver 30, the transmitter 52, the receiver 54, the UWB transceiver 66, the UWB transmitter 62, the UWB receiver 64, the antennas 55 (illustrated as 55A-55N, collectively the antenna 55) and/or the motion sensors 60 may be communicatively coupled directly or indirectly (e.g., through or via another component, a communication bus, a network) to one another to transmit and/or receive data between one another.

In some embodiments, the processor 12 may include a machine learning (ML) engine 40. While the ML engine 40 may be implemented in the processor 12 as illustrated in FIG. 2, in other embodiments the ML engine 40 may be implemented at least in part in other circuitry (e.g., other processing circuitry) or other hardware components that are separate from the processor 12. Moreover, the ML engine 40 may be implemented at least in part as software, and, as such, may be stored on the memory 14, in the cloud, or as a software as a service (SAAS). Indeed, the ML engine 40 may be implemented as logic, and thus may include hardware components (e.g., circuitry), software components (e.g., machine-executable instructions), or a combination of both. The hardware resources of the electronic device 10 may include any of the components shown in FIGS. 1 and 2, as well as those further discussed herein.

The electronic device 10 may include the UWB transmitter 62, the UWB receiver 64, transmitter 52 and/or the receiver 54 that respectively enable transmission and reception of data between the electronic device 10 and an external device via, for example, a network (e.g., including base stations) or a direct connection. As illustrated, the UWB transmitter 62 and the UWB receiver 64 may be combined into the UWB transceiver 66, and the transmitter 52 and the receiver 54 may be combined into the transceiver 30. The electronic device 10 may also have one or more antennas 55A-55N electrically coupled to the transceiver 30 or the UWB transceiver 66. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards, such as for ultra-wideband (UWB) communication discussed below.

The transmitter 52 may wirelessly transmit packets having different packet types or functions. For example, the transmitter 52 may transmit packets of different types generated by the processor 12. The receiver 54 may wirelessly receive packets having different packet types. In some examples, the receiver 54 may detect a type of a packet used and process the packet accordingly. In some embodiments, the transmitter 52 and the receiver 54 may transmit and receive information via other wired or wireline systems or means.

The UWB transmitter 62 and the UWB receiver 64 may respectively enable transmission and reception of UWB signals from a UWB communication node, such as a UWB anchor or UWB beacon. The UWB transmitter 62 and UWB receiver 64 may operate as location sensors, requesting and receiving fine-granularity location data from the UWB communication node. The location data may include an accuracy of between 1 and 30 centimeters (cm), between 3 and 20 cm, between 5 and 10 cm, and so on. Because of this fine-granularity location sensing, the UWB transmitter 62 and UWB receiver 64 may, in some embodiments, also operate as a motion sensor, detecting movement of the electronic device 10 greater than or equal to, for example, 5 centimeters. As such, in some embodiments, the motion sensor 60 may include the UWB transmitter 62 and UWB receiver 64. The UWB transmitter 62 and UWB receiver 64 may, similarly to the transmitter and receiver, be electrically coupled to one or more of the antennas 55A-55N.

The electronic device 10 may include motion sensors 60. Non-limiting examples of the motion sensors 60 may include an accelerometer or a gyroscope. As discussed in detail below, data acquired from the motion sensors 60 and UWB transceiver 66 may help the processor 12 determine operating characteristics of the electronic device 10. For example, the UWB transceiver 66 may track a location of the electronic device 10 (e.g., in a building, urban environment, rural environment, a vehicle, a train, a car, an airplane, and so on). In some embodiments, based at least in part on the location of the electronic device 10, the processor 12 may determine whether to activate a smart gesturing mode of the electronic device 10 and/or to execute the ML engine 40. For example, the electronic device 10 may include a software application associated with a grocery store, and the smart gesturing may be associated with indicating grocery store items in the grocery store. Accordingly, in response to determining that the electronic device 10 had entered and/or is located in the grocery store, the processor 12 may determine to activate a smart gesturing mode of the electronic device 10 and/or to execute the ML engine 40 as part of the software application associated with the grocery store. Alternatively, the processor 12 may determine whether to active a smart gesturing mode based on whether the processor 12 receives manual input from the user indicating a desire to activate the smart gesturing mode.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
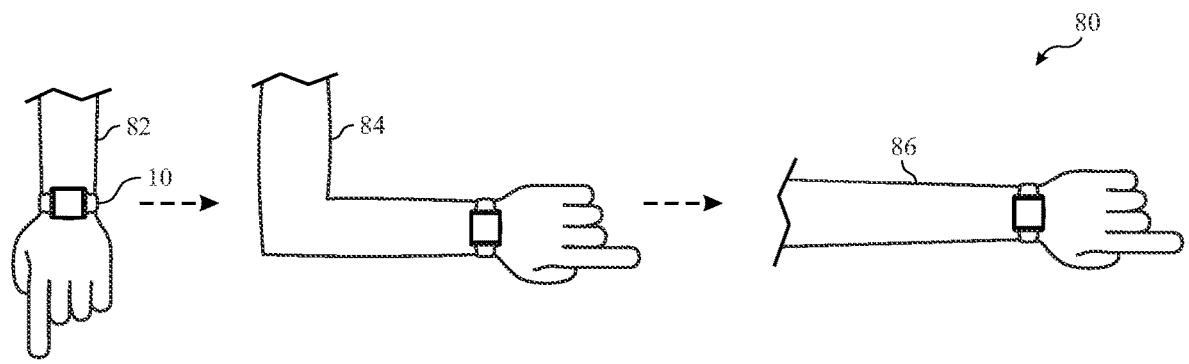
FIG. 3 is a perspective diagram of a smart gesture, according to embodiments of the present disclosure.

FIG. 3 is a perspective diagram of a smart gesture 80, according to embodiments of the present disclosure. As shown here, the electronic device 10 may be a wearable device (e.g., a smart watch), though in other embodiments, the electronic device 10 may include other wearable devices (e.g., a smart band, smart ring, or smart glasses) or the electronic device 10 may include a non-wearable user device (e.g., a smartphone). The smart gesture 80 may be identified at least by the one or more motion sensors 60 of the electronic device 10. The motion sensors 60 (e.g., an accelerometer or a gyroscope) may identify the smart gesture 80 by sensing a series of upward, downward, outward, inward, twisting, turning, and/or other similar motions indicative of a smart gesture (e.g., first position 82, second position 84, and third position 86). In some embodiments, this baseline gesture sensing may be determined by an initial calibration process. For example, the processor 12 may prompt the user to make a series of gestures (e.g., that, together, form a smart gesture) and the electronic device 10 may record the particular motions that the user makes while performing the smart gesture. In some embodiments, the processor 12 may request the user indicate an item in a viewpoint of the electronic device 10, and record and determine the user's actions. This may enable the electronic device 10 to identify a number of user-specific gestures that may be used (e.g., pointing with finger, pointing with hand, waving, nodding, rotating, and the like) as a smart gesture 80.

Figure 5:
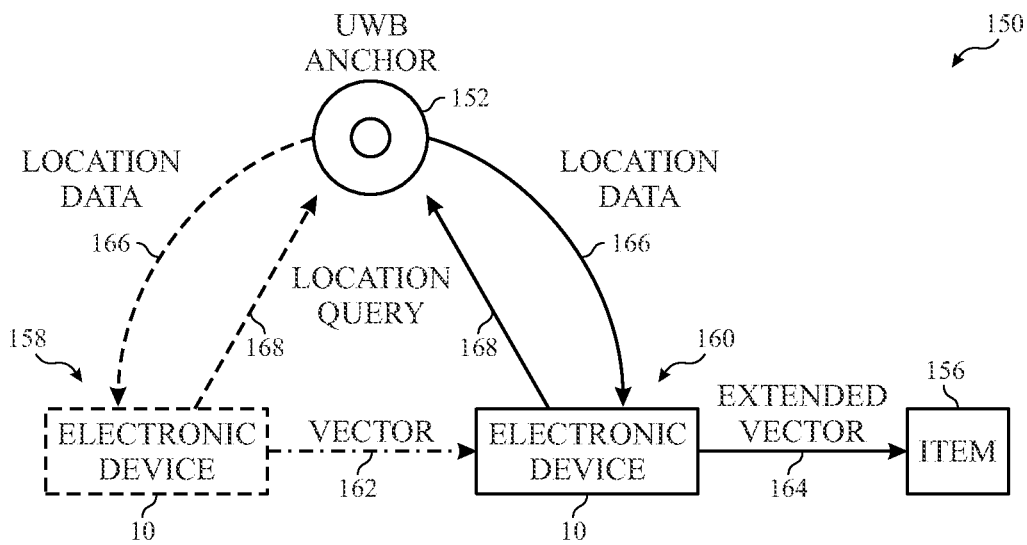
FIG. 5 is a perspective diagram illustrating identifying a target item of the smart gesture of FIG. 3 in a UWB anchor system, according to embodiments of the present disclosure.

For example, the first position 82 may indicate that the arm or hand having or holding the electronic device 10 is down by the user's side (e.g., a rest or non-gesturing position). The transition between the first position 82 and the second position 84 may indicate the beginning of the smart gesture 80. The transition between the second position 84 and the third position 86 may indicate an end of a smart gesture. In some embodiments, the transition between the second position 84 and the third position 86 may also indicate and/or identify a target item. Using these three positions, the electronic device 10 may determine that a smart gesture 80 is being executed, and may determine the direction in which the smart gesture 80 is being executed to determine what, if anything, is being gestured to. It should be understood that the three positions 82, 84, 86 illustrated in FIG. 5 are only examples, and any suitable number of positions (e.g., more or less than three) and any suitable positions and/or actions may make up the smart gesture 80. The smart gesture 80 may be any gesture a user may naturally make depending on personal preference and/or cultural context. For example, the smart gesture 80 may include pointing with a finger, pointing with a hand, an overhand or underhand waving motion, and so on. As another example, the smart gesture 80 may include holding the electronic device 10 (e.g., a smartphone) vertically, horizontally, aligned with the target item, and so on, and thrusting the electronic device 10 at the target item. As another example, the smart gesture 80 may include nodding or moving the user's head toward the target item, where the electronic device 10 may include smart glasses, earbuds, or wearable electronic devices coupled to the user's head. As yet another example, in the case where the electronic device 10 includes a microphone, the smart gesture 80 may include an audio cue (e.g., naming or otherwise speaking an indication of the item).

In an alternative embodiment, if the electronic device 10 is UWB-enabled, the gesture may be identified by the electronic device 10 using UWB location data. As previously stated, UWB technology may be accurate up to 5 centimeters in three-dimensional space. Thus, UWB-enabled electronic devices may receive location data from a UWB communication node (e.g., a UWB anchor) indicating that the electronic device 10 moved from a downward position (e.g., first position 82) to a certain position up (e.g., second position 84), then a final position outward (e.g., third position 86) indicating the smart gesture 80.

The process of identifying the smart gesture 80 may be refined for accuracy through machine learning via the ML engine 40. For example, the ML engine 40 may use motion sensor 60 data collected when a user is walking, running, swimming, sleeping, driving, waving to another person, and so on, to learn the non-smart gesture movements and distinguish those movements from a smart gesture 80. The ML engine 40 may also use location data (e.g., received by the receiver 54 or the UWB receiver 64) to learn at which locations the user is likely or unlikely to intend a movement to be a smart gesture 80. For example, the ML engine 40 may use location data to determine that the electronic device 10 is not on a smart gesture-enabled premises, and thus the ML engine 40 may prevent a number of smart gesture-based actions, such as preventing the UWB transmitter 62 from attempting to communicate with a UWB communication node, or preventing the transmitter 52 from attempting to query a smart shopping server for item location data. In this way, the ML engine 40 may use data obtained by various sensors and other components to reduce the number of misidentified or errant gestures. Additionally or alternatively, a user may choose to manually activate a smart gesturing mode. If the processor 12 incorrectly determines to not activate the smart gesturing mode, the user may manually activate the smart gesturing mode, enabling the selection and/or interaction with the surrounding environment through smart gestures 80.

In another alternative embodiment, an image-capturing device may identify the smart gesture 80. For example, the processor 12 of a pair of smart glasses may identify a gesture via image-capturing circuitry of the smart glasses. The image-capturing circuitry may identify the smart gesture 80 within the smart glasses' field of view, and may also identify an item gestured to if the item is likewise within the smart glasses' field of view.

In some embodiments, the smart gesture 80 may be identified without the use of a personal electronic device 10 (e.g., smart glasses). For instance, a premises may have a camera system (e.g., having multiple cameras enable a 360 degree or near 360 degree field of view) programmed to detect and identify (e.g., via artificial intelligence) the smart gesture 80. The camera system may use one or more camera angles to identify the smart gesture 80, then the same or different camera angles to identify what is being gestured to. For example, the camera system may use a first camera angle to identify the smart gesture 80. The camera system may, in response to identifying the smart gesture 80, use one or more different camera angles (e.g., from one or more different cameras of the camera system) to identify what is being gestured to. The electronic device 10 may establish a connection with the camera system to receive feedback on the item indicated by the smart gesture 80 and determined by the camera system. For example, the electronic device 10 may establish a connection (e.g., a Wi-Fi connection) with the camera system upon entering the field of view of one or more of the cameras of the camera system. The camera system may, using a first camera, detect a gesture of the user and determine that the gesture is a smart gesture 80. The camera system may then, using one or more additional cameras (e.g., with additional and/or different fields of view from the first camera) of the camera system, determine that a piece of artwork is indicated by the smart gesture 80. The electronic device 10 may then receive (e.g., via the receiver 54) information pertaining to the targeted artwork from the camera system. The electronic device 10 may enable selection of additional information regarding the target piece of artwork, as will discussed in the discussion of FIG. 16 below.

Figure 4:
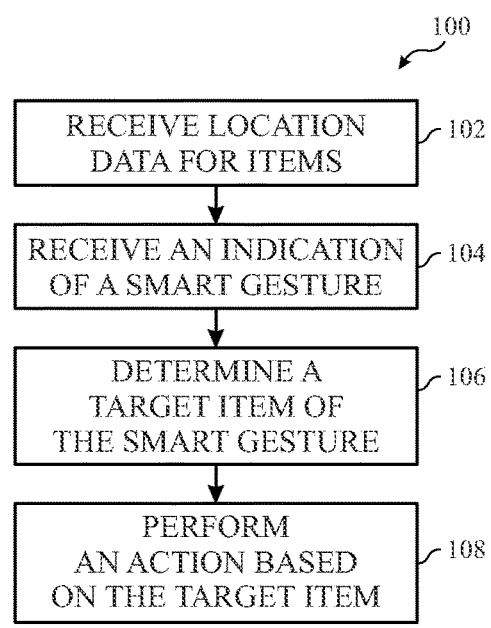
FIG. 4 is a flowchart of a method for identifying the smart gesture of FIG. 3, according to embodiments of the present disclosure.

FIG. 4 is a flowchart of a method 100 for identifying a smart gesture 80 and determining an item targeted by the smart gesture 80, according to an embodiment of the present disclosure. Any suitable device (e.g., a controller) that may control components of the electronic device 10, such as the processor 12, may perform the method 100. In some embodiments, the method 100 may be implemented by executing instructions stored in a tangible, non-transitory, computer-readable medium, such as the memory 14 or storage 16, using the processor 12. For example, the method 100 may be performed at least in part by one or more software components, such as an operating system of the electronic device 10, one or more software applications of the electronic device 10, and the like. While the method 100 is described using steps in a specific sequence, it should be understood that the present disclosure contemplates that the described steps may be performed in different sequences than the sequence illustrated, and certain described steps may be skipped or not performed altogether.

In process block 102, the electronic device 10 may receive location data for items on a premises. The premises may be a business premises (e.g., a grocery store, and the electronic device 10 may receive location data for each grocery item), a recreational premises (e.g., an art gallery, and the electronic device 10 may receive location data for each painting), and so on. The electronic device 10, and more particularly the receiver 54, may receive the location data by querying (e.g., via the transmitter 52) a server for the location data or may receive the location data from a software application installed on the electronic device 10. For example, the software application may provide a virtual map of the premises (e.g., of the art gallery) with the location of each item on the premises (e.g., the location of each piece of artwork in the art gallery). As previously stated, smart gesturing may be facilitated by 5G network slicing. 5G network slicing entails dividing a single 5G network connection into multiple distinct virtual connections that provide various resources to different types of network traffic. Thus, a smart gesture-enabled premises may have a virtualized 5G network dedicated to supporting smart gesture operation, such as a 5G network provided by a retailer providing one or more virtual connections specifically for smart shopping. For example, the smart gesture-enabled art gallery may provide a virtual connection specifically for interacting with the artwork. This may enable the smart gesture-enabled art gallery to tailor its network resources to smart gesture interactions, enabling the art gallery to increase or decrease the resources (e.g., storage, processing power) for the smart gesture virtual connection as needed.

In process block 104, the electronic device 10 may receive an indication of a smart gesture 80. As previously stated, the electronic device 10 may receive the indication of the smart gesture 80 via the motion sensors 60, the UWB transceiver 66 for UWB-enabled electronic devices, image capturing circuitry of a wearable electronic device (e.g., smart glasses), a camera system, and so on.

In process block 106, the electronic device 10 may determine a target item of the gesture. In particular, the electronic device 10 may determine the target item using the smart gesture 80 and the location data received in process block 102. Upon obtaining the location data, the electronic device 10 may determine the location of each item on the premises. Further, the electronic device 10 may determine its own location within the premises (e.g., using an RTLS such as a UWB location system). Upon receiving the indication of the smart gesture 80, the electronic device 10 may determine (e.g., via determining an angle and direction of the smart gesture 80) an area indicated by the gesture 80, and determine an item with a location corresponding to the area indicated by the gesture 80.

In process block 108, the electronic device 10 may, in response to determining the target item of the gesture, perform an action based on the target item. The specific action to be performed may depend on the context in which the smart gesture 80 is performed. For example, if the target item is a lamp in a furniture store, the electronic device 10 may provide information on the lamp (e.g., price, dimensions, maker, and weight). The electronic device 10 may also provide an option to purchase the lamp via electronic checkout. In some embodiments, the electronic device 10 may display the lamp in a virtual room corresponding to an actual room of the user. As such, the method 100 may enable the electronic device 10 to identify the smart gesture 80 and determine the item targeted by the smart gesture 80.

FIG. 5 is a perspective diagram illustrating identifying a target item 156 in a UWB anchor system 150, according to an embodiment of the present disclosure. The UWB anchor system 150 may include a UWB anchor 152, the electronic device 10, and the target item 156. The UWB system 150 may be a real-time locating system (RTLS) that uses a UWB communication node (e.g., the UWB anchor 152) to communicate with and track the location of UWB-enabled devices (e.g., the electronic device 10) for precise indoor and/or outdoor positioning in real-time. The UWB system 150 may enable the electronic device 10 to identify the target item 156 using the smart gesture 80 discussed above and the location information received from the UWB anchor 152. In particular, the UWB anchor system 150 operates by having one or more UWB anchors 152 deployed in fixed position throughout a premises. The UWB anchors 152 may detect and locate a transmitting UWB device (e.g., the electronic device 10) to an accuracy of up to 5 centimeters. The signals emitted by the electronic device 10 (e.g., via UWB transmitter 62) may be received by the UWB anchors 152 within communication range of the electronic device 10. The UWB anchors 152 (or a central UWB communication hub) may analyze (e.g., using Time Difference of Arrival (TDoA)) the data received from the electronic device 10 to determine the arrival time of the data of the electronic device 10 to each UWB anchor 152, and thus triangulate the location of the electronic device 10.

Figure 6:
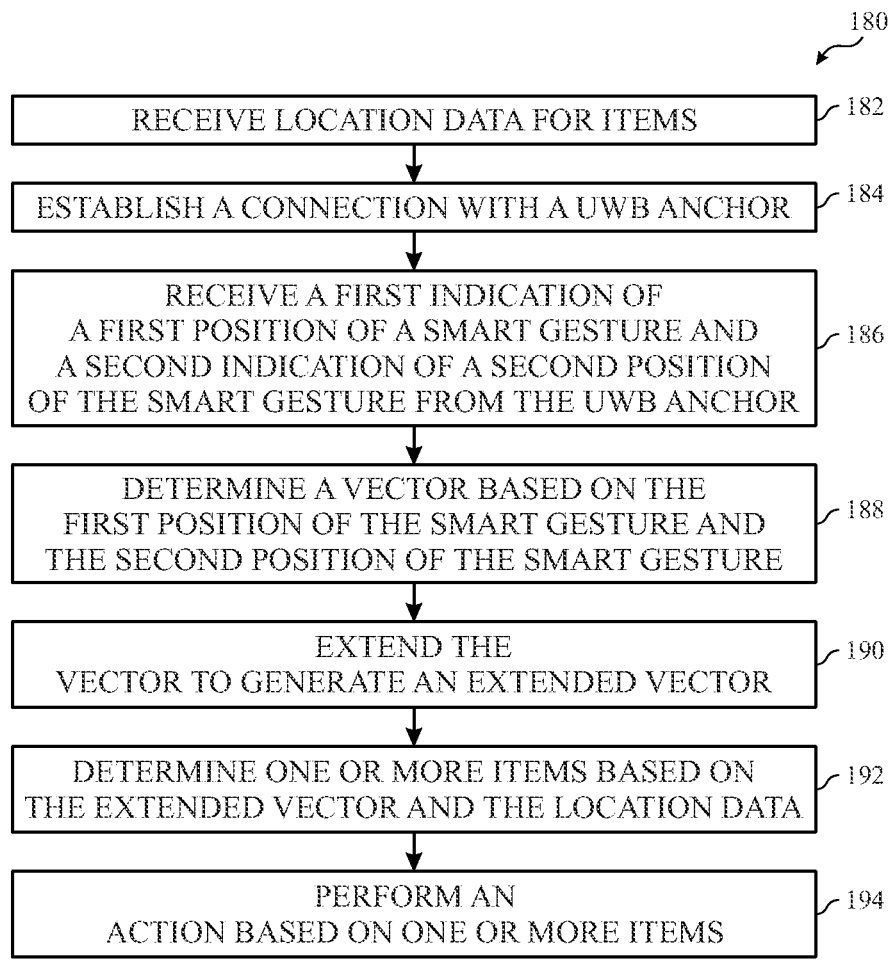
FIG. 6 is a flowchart of a method for identifying the target item using the UWB anchor system of FIG. 5, according to embodiments of the present disclosure.

FIG. 6 is a flowchart of a method 180 for identifying the target item 156 using the UWB anchor system 150, according to an embodiment of the present disclosure. Any suitable device (e.g., a controller) that may control components of the electronic device 10, such as the processor 12, may perform the method 180. In some embodiments, the method 180 may be implemented by executing instructions stored in a tangible, non-transitory, computer-readable medium, such as the memory 14 or storage 16, using the processor 12. For example, the method 180 may be performed at least in part by one or more software components, such as an operating system of the electronic device 10, one or more software applications of the electronic device 10, and the like. While the method 180 is described using steps in a specific sequence, it should be understood that the present disclosure contemplates that the described steps may be performed in different sequences than the sequence illustrated, and certain described steps may be skipped or not performed altogether.

The electronic device 10 may perform process block 182 similarly to process block 102 in FIG. 4. In process block 184, the electronic device 10 may establish a connection with the UWB anchor 152. The connection may be established using the UWB transceiver 66 over the UWB frequency range (e.g., between 3.1 megahertz to 10.6 megahertz).

In process block 186, the electronic device 10 may receive a first indication of a first position (e.g., 158) and a second indication of a second position (e.g., 160) of the smart gesture 80 from the UWB anchor 152. In some embodiments, the electronic device 10 may receive the first position 158 and the second position 160 by initiating communication with the UWB anchor 152 by submitting a location query 168 (e.g., via the UWB transmitter 62) to the UWB anchor 152 for a position of the electronic device 10. This may be done automatically (e.g., the processor 12 determines, using at least location data of the electronic device 10, that the electronic device 10 is within a smart gesturing-enabled premises) or may be done manually (e.g., by the user manually selecting a smart gesturing mode on the electronic device 10). The UWB anchor 152 may, in response, send location data 166, which may be received by the UWB receiver 64 of the electronic device 10 with a latency as low as 1 millisecond.

The first position 158 may indicate a beginning of the smart gesture 80, while the second position 160 may indicate an end of the smart gesture 80. As previously discussed, the first position 158 and the second position 160 may be identified by the motion sensor 60 as well as the UWB location data. In process block 188, the electronic device 10 may determine a vector (e.g., 162) based on the first position 158 and the second position 160. In particular, the electronic device 10 may generate the vector from a first point in three-dimensional space corresponding to the first position 158 to a second point corresponding to the second position 160. The first position 158 and the second position 160 of the electronic device 10 may be examples of any first position and any second position (or more or less positions) of the electronic device 10 indicative of any gesture that indicates a target item (e.g., 156).

The electronic device 10 may determine the first position 158 and the second position 160 based on an initial calibration process, as discussed above. In some embodiments, the electronic device 10 may refine its detection of the first position 158 and the second position 160 using the ML engine 40. This calibration and refinement may also reduce the occurrence of gesture misidentifications (e.g., the electronic device 10 misreading a movement as a smart gesture 80, or the electronic device 10 not detecting an intended smart gesture 80). As previously stated, the first position 158 may indicate to the electronic device 10 a beginning of a smart gesture 80. Upon the electronic device 10 receiving the first indication of the first position 158, the electronic device may begin receiving, analyzing, and/or processing sensor data (e.g., data from motion sensor 60) to determine the parameters (e.g., direction and magnitude) of the vector 162. Likewise, the second position 160 may indicate to the electronic device 10 an end of the smart gesture 80, and upon the electronic device 10 receiving the second indication of the second position 160, the electronic device 10 may generate the vector 162.

In process block 190, the electronic device 10 may extend the vector 162 to generate the extended vector 164. The extended vector 164 may have a direction based off of the direction of the vector 162, and may extend the magnitude of the vector 162 outward towards one or more items in the area (e.g., the target item 156). In process block 192, the electronic device 10 may determine the one or more target items 156 based on the extended vector 164 and the location data received by the electronic device 10. In particular, the electronic device 10 may determine the one or more items as those that are in the path of the extended vector 164. That is, the extended vector 164 may extend towards a particular area of the premises, and the electronic device 10 may determine location data that corresponds to the area to identify the one or more items (e.g., including the target item 156).

In process block 194, the electronic device 10 may perform an action, such as provide feedback (e.g., enabling a selection of one item of one or more selectable items, enabling confirmation or denial of an item that the electronic device 10 determines as the target item 156, and so on), as discussed in process block 108 in FIG. 4 and will also be discussed below in the discussion of FIGS. 9 and 10. As such, the method 180 enables the electronic device 10 to identify the target item 156 using the UWB anchor system 150.

Figure 7:
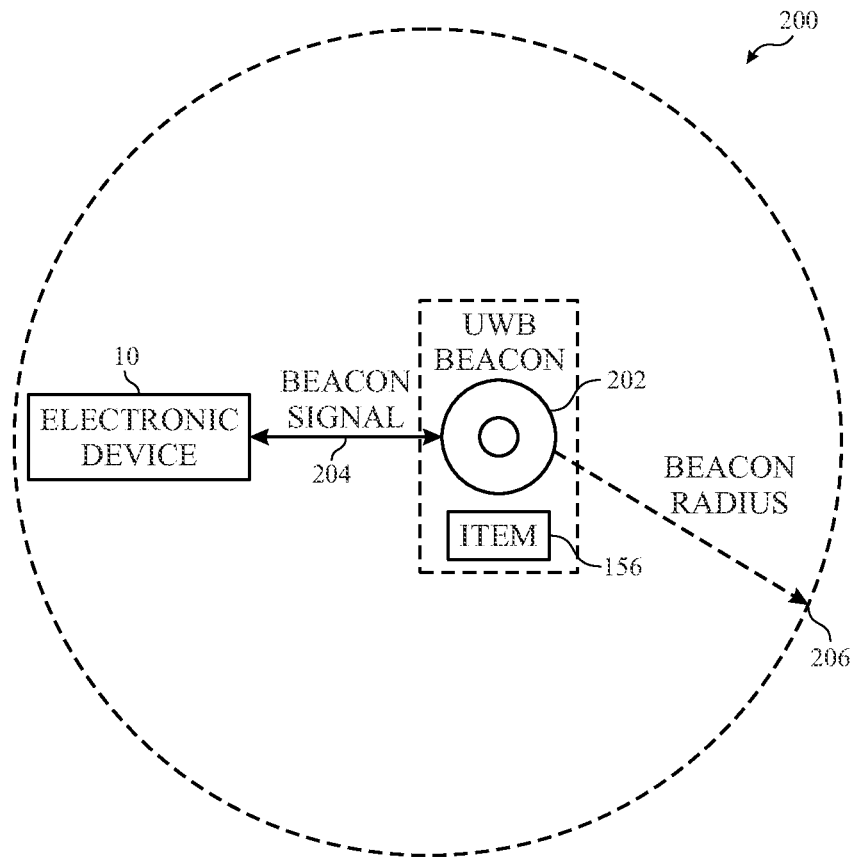
FIG. 7 is a perspective diagram illustrating identifying a target item in a UWB beacon system, according to embodiments of the present disclosure.

FIG. 7 is a perspective diagram illustrating identifying a target item 156 in a UWB beacon system 200, according to embodiments of the present disclosure. The UWB beacon system 200 may include the electronic device 10, a UWB beacon 202 associated with an item, wherein the UWB beacon 202 may be communicatively connected to the electronic device 10 by a beacon signal 204, and a beacon radius 206, within which the electronic device 10 may communicate with the UWB beacon 202. The UWB beacon system 200 may enable communication between the electronic device 10 and the UWB beacon 202. In particular, the UWB beacon 202 may communicate with the electronic device 10 via two-way ranging (TWR). TWR may enable two-way communication between the UWB beacon 202 and the electronic device 10. The electronic device 10 may determine a smart gesture 80 indicating the item (e.g., target item 156) associated with the UWB beacon 202, such that the electronic device 10 may receive (e.g., via the UWB receiver 64) the beacon signal 204 of the UWB beacon 202 associated with the item indicated by the smart gesture 80, so long as the electronic device 10 is within the beacon radius 206. Upon receiving the beacon signal 204, the electronic device 10 and the UWB beacon 202 may begin ranging with each other to determine their distance as they communicate.

Figure 8:
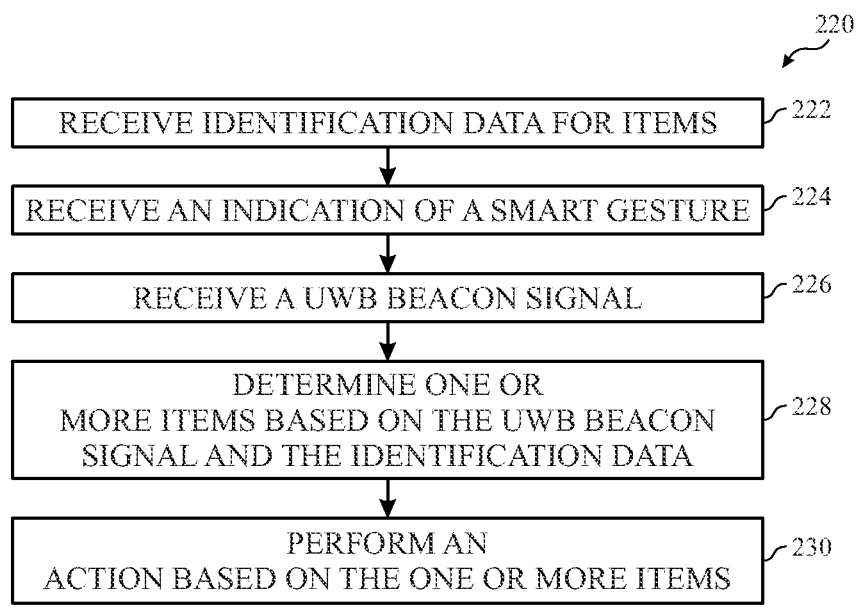
FIG. 8 is a flowchart of a method for identifying the target item in the UWB beacon system of FIG. 7, according to embodiments of the present disclosure.

FIG. 8 is a flowchart of a method 220 for identifying the target item 156 using the UWB beacon system 200, according to embodiments of the present disclosure. Any suitable device (e.g., a controller) that may control components of the electronic device 10, such as the processor 12, may perform the method 220. In some embodiments, the method 220 may be implemented by executing instructions stored in a tangible, non-transitory, computer-readable medium, such as the memory 14 or storage 16, using the processor 12. For example, the method 220 may be performed at least in part by one or more software components, such as an operating system of the electronic device 10, one or more software applications of the electronic device 10, and the like. While the method 220 is described using steps in a specific sequence, it should be understood that the present disclosure contemplates that the described steps may be performed in different sequences than the sequence illustrated, and certain described steps may be skipped or not performed altogether.

In process block 222, the electronic device 10 may receive identification data for items on a premises (e.g., receive identification data for food or drink items in a food court). The identification data may include any suitable identifier that indicates a specific item, such as an identification number, an alphanumeric code, a serial number, or the like. Similar to receiving location data in process blocks 102 and 182 in FIGS. 4 and 6 respectively, the electronic device 10 may receive the identification data for the items via querying a server for the identification data or by installing or updating a software application on the electronic device 10 with the identification data thereon. The identification data of a particular item may be linked to or otherwise associated with a particular UWB beacon signal 204 (and the corresponding UWB beacon 202). In process block 224, the electronic device 10 may receive an indication of the smart gesture 80, similarly to process block 104 of FIG. 4.

In process block 226, in response to receiving the indication of the smart gesture 80 toward the UWB beacon 202 and being within the beacon radius 206 of the UWB beacon 202, the electronic device 10 may receive the beacon signal 204. In some embodiments, the electronic device 10 may activate the UWB receiver 64 (and thus enable communication with the UWB beacon 202) in response to receiving the indication of the smart gesture 80. In another embodiment, the UWB receiver 64 may already be activated and may receive the beacon signals 204 upon entering the beacon radius 206. However in this embodiment the electronic device 10 may ignore the beacon signals 204 until the electronic device 10 receives the indication of the smart gesture 80.

In process block 228, the electronic device 10 may determine one or more items (e.g., including the target item 156) based on the beacon signal 204 of the UWB beacon 202 and the identification data. As previously stated, the identification data of a particular item may be linked to or otherwise associated with a particular UWB beacon signal 204 (and the corresponding UWB beacon 202). Therefore, the electronic device 10 may determine the identification data that correlates to the UWB beacon signal 204, and determine the item (e.g., the target item 156) that is associated with the identification data.

In process block 230, the electronic device 10 may perform the action based on the one or more items similarly to process block 108 and 194 of FIGS. 4 and 6, respectively. In the situation where the smart gesture 80 indicates multiple UWB beacons 202 and/or the electronic device 10 is within the beacon radius 206 of multiple UWB beacons 202, the electronic device 10 may have a variety of ways of prioritizing the items on which to perform the action. In certain embodiments, the electronic device 10 may only perform the action on the item with the associated UWB beacon 202 in closest proximity to the electronic device 10. For example, if the electronic device 10 receives a gesture targeting multiple furniture items placed nearby each other in a display, with a UWB beacon 202 indicating a chair 1.5 meters away from the electronic device 10, a UWB beacon 202 indicating a desk 3 meters away, and a UWB beacon 202 indicating a lamp 5.5 meters away, and the electronic device 10 is within the beacon radius 206 of all three items, the electronic device 10 may only perform an action on the chair, as it is the nearest to the electronic device 10. In other embodiments, the electronic device 10 may perform an action on only items within a predetermined range. Using the example above, the electronic device 10 may perform an action on all items targeted within a range of less than 5 meters. Thus, the electronic device 10 may only perform an action on the chair and the desk, and the lamp exceeds the threshold range. In this way, the user is not overwhelmed by an excessive selection of items. As another example, the electronic device 10 may be within the range of all three items (e.g., the chair, the lamp, and the desk). Upon receiving the beacon signal 204 associated with each of the three items, the electronic device 10 may (e.g., via the display 18) enable selection of the items. The electronic device 10 may then receive input (e.g., via the input structures 22) indicating a selection of all 3 of the items, some of the items, or none of the items. As such, the method 220 may enable identifying the target item 156 using the UWB beacon system 200.

Figure 9:
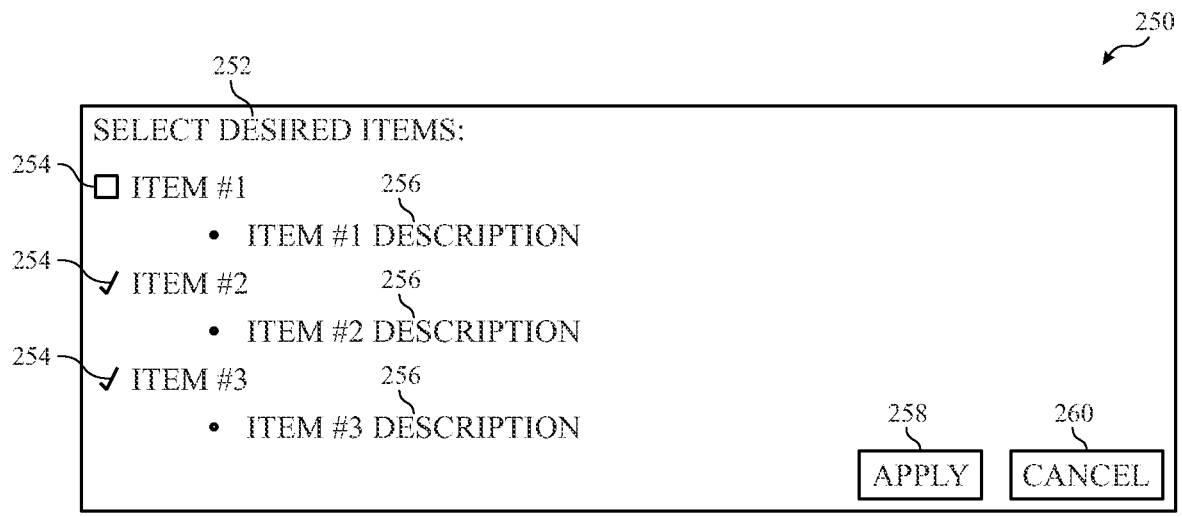
FIG. 9 is an illustration of feedback that may be provided by the electronic device of FIG. 1 in response to determining one or more items targeted by a smart gesture, according to embodiments of the present disclosure.

FIG. 9 is an illustration of feedback that may be provided by the electronic device 10 in response to determining one or more items targeted by a smart gesture (e.g., the smart gesture 80), according to embodiments of the present disclosure. Providing feedback may be one of the action performed by the electronic device 10 as described in process blocks 108, 194, and 230 of FIGS. 4, 6, and 8, respectively. As illustrated, the feedback provided by the electronic device 10 may include displaying a graphical user interface (GUI) 250 (e.g., on the display 18 of the electronic device 10). If multiple items are identified (e.g., more than one item is indicated by or within a threshold distance of the extended vector 164, the electronic device 10 receives more than one beacon signal 204, or more than one item is associated with a single beacon signal 204), then the electronic device 10 may enable selection of each item, or may be given an option to cancel and select no items. For example, the electronic device 10 may display a menu or list including a header 252, the selectable items 254, and a description 256 of each selectable item 254, and enable selection of each selectable item 254 (e.g., via an input structure 22). The header 252 may include provide instructions to select the items. The selectable items 254 may be selected using an input button or control (e.g., using the "Apply" affordance 258) to perform an action (e.g., modify an order or quantity of the selected items or purchase the selected items), or the user may cancel the selection (e.g., using the "Cancel" affordance 260) to exit out of the GUI 250 (e.g., and not order or purchase the selected items).

Figure 10:
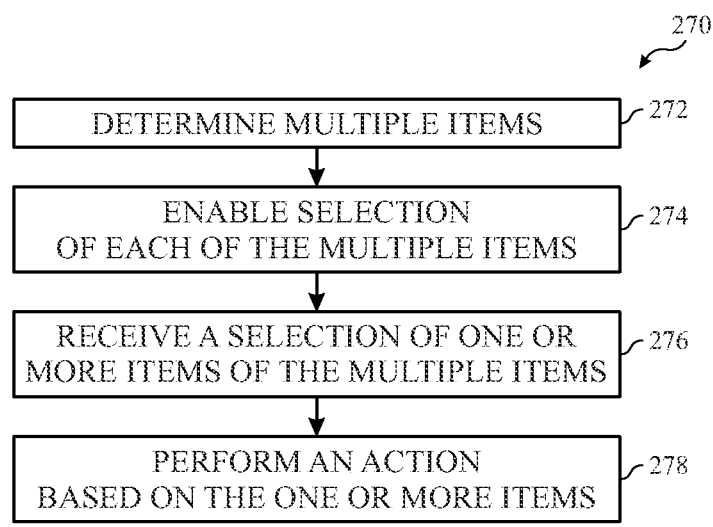
FIG. 10 is a flowchart of a method for enabling selection of the target item based on the feedback provided in FIG. 9, according to embodiments of the present disclosure.

FIG. 10 is a flowchart of a method 270 for enabling selection of the target item 156 among multiple items, according to embodiments of the present disclosure. In particular, the selection may be enabled by and provided to the electronic device 10, when using a smart gesturing system (e.g., the UWB anchor system 150 or the UWB beacon system 200). Any suitable device (e.g., a controller) that may control components of the electronic device 10, such as the processor 12, may perform the method 270. In some embodiments, the method 270 may be implemented by executing instructions stored in a tangible, non-transitory, computer-readable medium, such as the memory 14 or storage 16, using the processor 12. For example, the method 270 may be performed at least in part by one or more software components, such as an operating system of the electronic device 10, one or more software applications of the electronic device 10, and the like. While the method 270 is described using steps in a specific sequence, it should be understood that the present disclosure contemplates that the described steps may be performed in different sequences than the sequence illustrated, and certain described steps may be skipped or not performed altogether.

In process block 272, the electronic device 10 may determine multiple items indicated by, at least, the smart gesture 80 similarly to process blocks 106, 192, 228 of FIGS. 4, 6, and 8, respectively. In process block 274, the electronic device 10 may enable selection of the multiple items, as was described in the discussion of GUI 250 and selectable items 254 in FIG. 9. The electronic device 10 may receive a selection of one or more of the selectable items 254. For example, referring to FIG. 9, Item #2 and Item #3 of the selectable items 254 may be selected (e.g., by a user), and an indication of the selection may accompany the selected items (e.g., by displaying checkmarks). This illustration is shown by way of example, and in other situations there may be more or fewer selectable items 254, and any number of the selectable items 254 may be selected, or none of the selectable items 254 may be selected. In process block 276, the electronic device 10 may perform an action based on the one or more selected items (e.g., Item #1 and Item #2 in FIG. 9). As previously stated, this action may be performed upon the chosen selection being applied (e.g., by selecting one or more of the selectable items 254 and then selecting the "Apply" affordance 258). The action performed may be one action of a number of actions depending on the context of the selection. For example, in the context of smart shopping at a furniture store, the action may include providing additional information on selected items (e.g., price, composition, availability), providing an option to purchase the selected items, providing an option to receive delivery of the item via an automated guided vehicle (AGV), autonomous robotic vehicle, or drone, providing an option to show the selected items in a virtual room associated with the user's house, and so on.

In one embodiment, the electronic device 10 may provide the option to receive delivery of a meal purchased in a smart gesture-enabled restaurant by AGV. Upon selection of the option to receive delivery of the meal by AGV, the electronic device 10 may transmit (e.g., using the transmitter 52) the selection. The AGV may pick up or be given the meal and deliver it to a location within the restaurant. In particular, the location of the electronic device 10 (e.g., as determined by the UWB transceiver 66) may be sent to the AGV, and the AGV, which itself may be equipped with a UWB transceiver, may deliver the purchased meal to the location of the electronic device 10 based on the location of the electronic device 10 and determining its own location. In some embodiments, the locations of the electronic device 10 and the AGV may be determined periodically and/or in real-time, the delivery path of the AGV may be updated (e.g., in real-time) while based on changes in location of the electronic device 10 and/or the AGV. Alternatively, a customer may order online from outside of the restaurant (e.g., from the customer's home), and the purchased meal may be delivered to the customer's home (e.g., via a drone or other remote-controlled device).

In another embodiment, in the context of smart shopping at a smart gesturing-enabled furniture store, the action performed (e.g., in process block 278) may include providing additional information on selected items (e.g., price, composition, availability) or the action may include providing an option to purchase the selected items. In certain embodiments, the action performed may include rendering a three-dimensional (3D) model of the target item 156 in a software application installed on the electronic device 10. The customer may then view the 3D model of the target item 156 in a 3D environment (e.g., a 3D model of a room), a two-dimensional (2D) environment (e.g., using an image of a room), or via augmented reality (e.g., viewing a room through an augmented-reality filter, the augmented reality filter including the 3D model of the target item 156). For example, the software application may be a furniture store application that enables the customer to take a picture of a room in the customer's home. Upon the electronic device 10 receiving a selection of a target item 156 (e.g., a piece of furniture) at the smart gesturing-enabled furniture store (e.g., as discussed in process block 276), may, via the software application, render the 3D model of the target item 156. The software application may then overlay the 3D model of the target item 156 onto the picture of the room, so as to enable the customer to view what the target item 156 (e.g., a piece of furniture) might look like in the room of the customer's home. Additionally or alternatively, the customer may select one or more furniture items, store them within the software application, return home, and view the 3D model of the one or more furniture items in the customer's home (e.g., using an augmented reality filter on the image-capturing circuitry of the electronic device 10). It should be noted that these examples are not intended to be limiting, and a variety of actions may be performed based on the selection of one or more items, as discussed elsewhere in this specification. As such, method 270 may enable selection of the target item 156 among multiple items.

Figure 11:
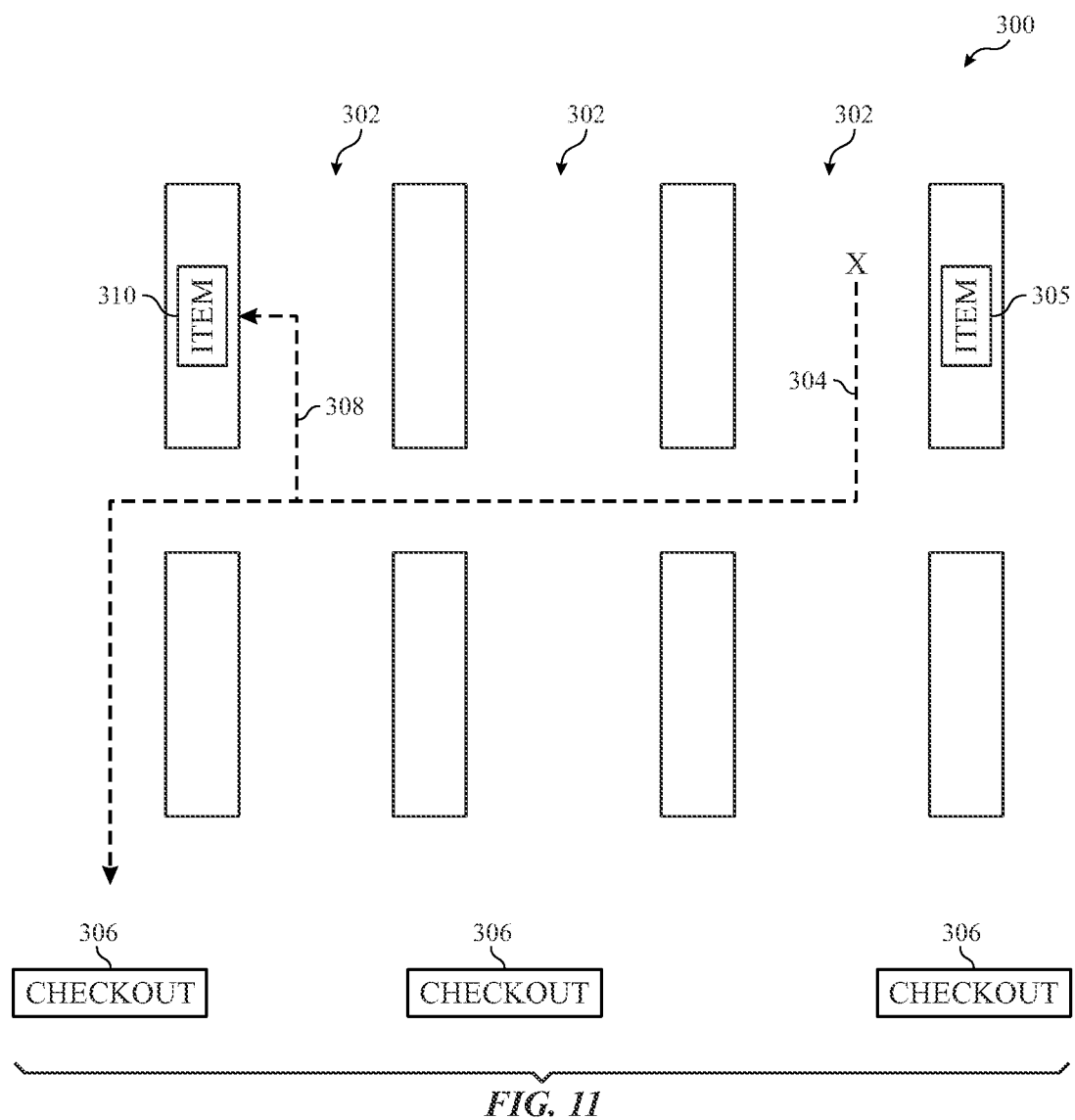
FIG. 11 is a diagram of a smart shopping-enabled business premises, according to embodiments of the present disclosure.

FIG. 11 is a diagram of a smart shopping-enabled business premises 300, according to embodiments of the present disclosure. The smart shopping-enabled business premises 300 may include aisles 302 between which items are stored (e.g., on shelves). The electronic device 10 may receive an indication that a desired item 305 was selected by smart gesture at location 'X', and then provide a path 304 to a checkout station 306, or an alternate path 308 to another desired item 310. In one embodiment, the item 310 may be determined by a shopping list on a software application installed on the electronic device 10. For example, the customer may have bread on the shopping list, and the electronic device 10 may guide the user to the bread aisle in the smart shopping-enabled business premises 300. The electronic device 10 may then identify the smart gesture 80 that may indicate the specific type or brand of bread desired (e.g., the item 310). In another embodiment, upon receiving an indication of a first item 305 the electronic device 10 may recommend other items (e.g., item 310) in the store, such as items for a recipe based on the item 305, and provide a path 308 to the recommended item 310.

Figure 12:
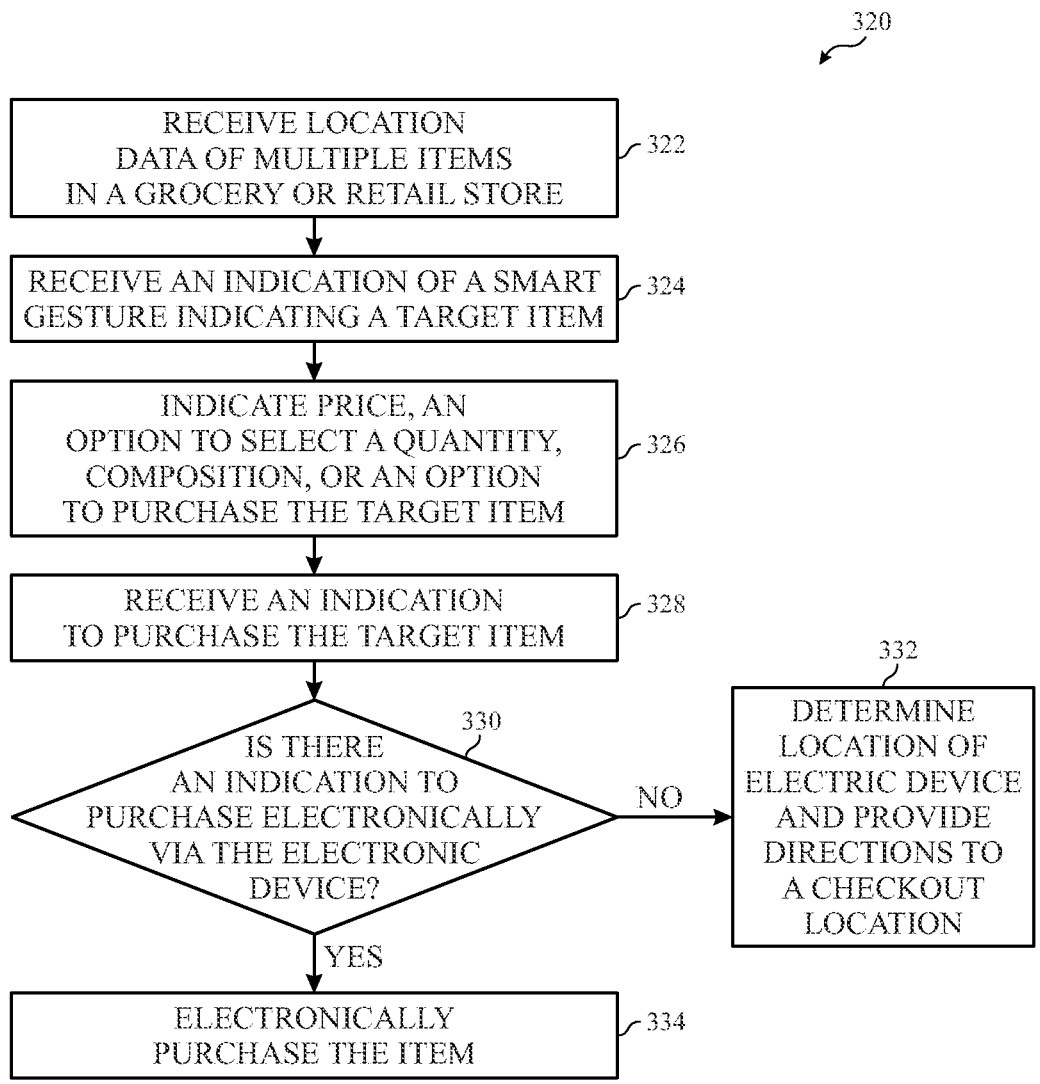
FIG. 12 is a flowchart of a method for smart shopping at the smart shopping-enabled business premises of FIG. 11, according to embodiments of the present disclosure.

FIG. 12 is a flowchart of a method 320 for smart shopping at the smart shopping-enabled business premises 300, according to an embodiment of the present disclosure. Any suitable device (e.g., a controller) that may control components of the electronic device 10, such as the processor 12, may perform the method 320. In some embodiments, the method 320 may be implemented by executing instructions stored in a tangible, non-transitory, computer-readable medium, such as the memory 14 or storage 16, using the processor 12. For example, the method 320 may be performed at least in part by one or more software components, such as an operating system of the electronic device 10, one or more software applications of the electronic device 10, and the like. While the method 320 is described using steps in a specific sequence, it should be understood that the present disclosure contemplates that the described steps may be performed in different sequences than the sequence illustrated, and certain described steps may be skipped or not performed altogether.

In process block 322, the electronic device 10 may receive location data of multiple items in a grocery store or retail store similarly to process block 102 of FIG. 4. In process block 324, the electronic device 10 may receive an indication of a smart gesture 80 indicating a target item 156, similarly to process block 106 of FIG. 4. In process block 326, the electronic device 10 may, in response to receiving an indication of the smart gesture 80 indicating the target item 156, indicate relevant information of the target item, such as price, composition, an option to select a quantity of the item, or an option to purchase the target item electronically via the electronic device 10 or purchase at the checkout station 306. This information may be displayed in a GUI, such as GUI 250. In process block 328, the electronic device 10 may receive an indication to purchase the target item 156. This indication may be received as input at the input structures 22 of the electronic device 10. In query block 330, the electronic device 10 may determine whether there is an indication to purchase the target item 156 electronically via the electronic device 10, thus enabling the customer to purchase the target item 156 at any location on the smart shopping-enabled business premises 300 without waiting in line at the checkout station 306. The electronic device 10 may make this determination based on the selection of an affordance indicating the option to purchase the target item 156 electronically via the electronic device 10, or the selection of an affordance indicating the option to purchase the target item 156 via the checkout station 306. If the electronic device 10 does not receive an indication to purchase the item via electronic checkout using the electronic device 10 (e.g., the electronic device 10 receives input selecting checkout via the checkout station 306), then, in process block 332, the electronic device 10 may determine the location of the electronic device 10 (e.g., using the UWB anchor 152 and/or the UWB beacon 202) and provide directions to the checkout station 306, as is shown by path 304. In some embodiments, the electronic device 10 may determine which checkout station 306 has the shortest wait time, and direct the customer accordingly. Alternatively, if the electronic device 10 does receive an indication to purchase the target item 156 via the electronic device 10 in process block 334, the electronic device 10 may electronically purchase the target item 156.

In another embodiment, the electronic device 10 may, in response to receiving an indication to purchase electronically via the electronic device 10, enable selection of an option to deliver the target item 156 and may setup the target item 156 for delivery (e.g., at an address provided by the user). The option to choose delivery upon purchasing the target item 156 electronically via the electronic device 10 may be especially valuable in smart shopping situations such as smart shopping at a furniture store or an art gallery. This option may result in greater ease of use for customers to be able to customize their smart shopping experience and tailor the experience to their specific needs. For example, if a furniture store customer merely wants to purchase a table lamp, the customer may purchase the table lamp by gesturing at the table lamp with the electronic device 10, provide an indication to purchase the lamp electronically via the electronic device 10, and exit the premises with the table lamp without waiting in line at the checkout station 306. However, if the customer desires to purchase a furniture set including the table lamp, an office desk, and an armchair, the customer may gesture at the items with the electronic device 10, choose to purchase the set for delivery on the electronic device 10, and the furniture store's professional delivery service may deliver the items to a location of the customer's choosing. As such, the method 320 may enable smart shopping at the smart shopping-enabled business premises 300.

Figure 13:
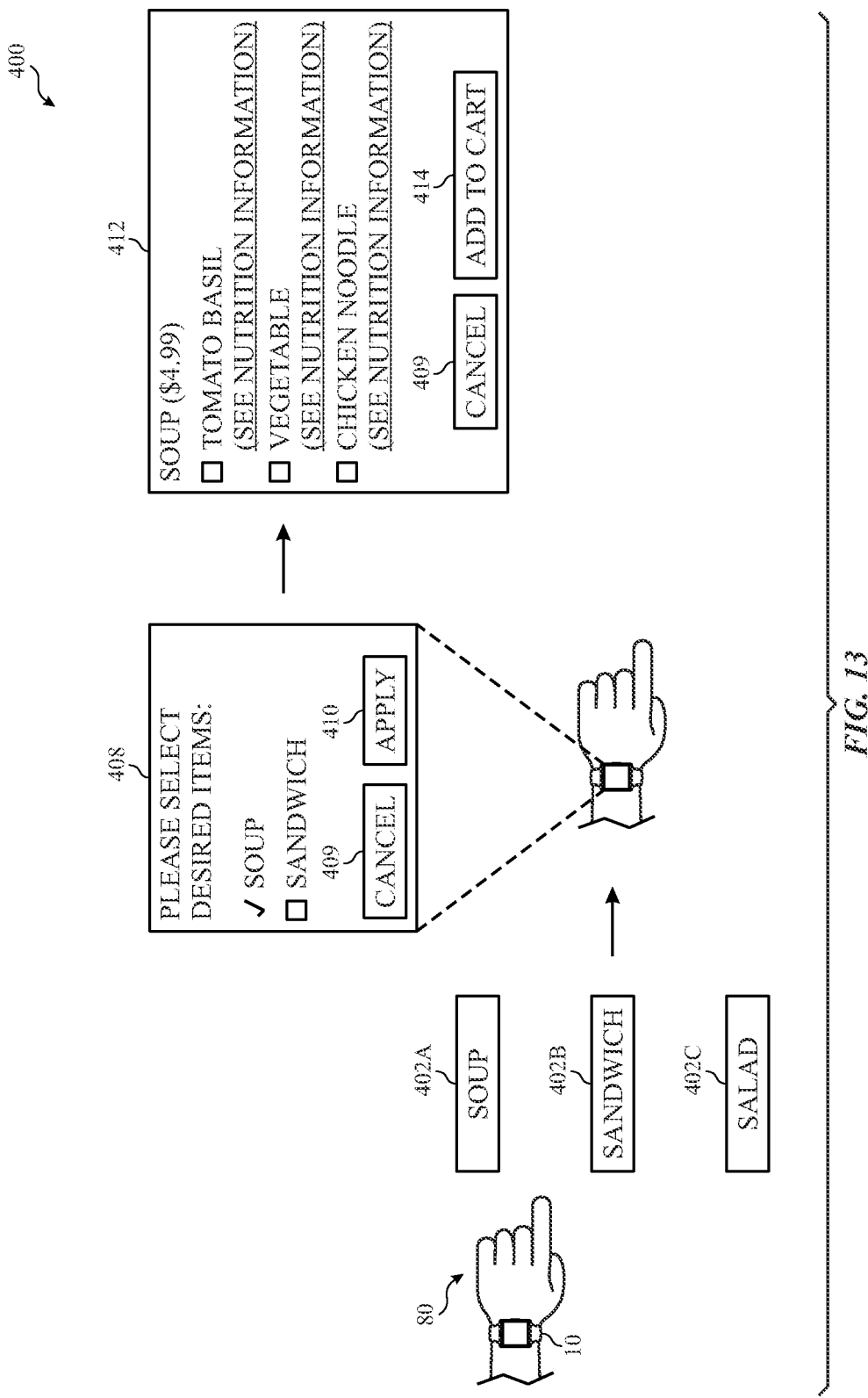
FIG. 13 is a perspective diagram of smart gesturing operation in a smart gesture-enabled restaurant, according to embodiments of the present disclosure.

FIG. 13 is a perspective diagram of smart gesturing operation in a smart gesture-enabled restaurant 400, according to embodiments of the present disclosure. Smart gesturing operation in a smart gesture-enabled restaurant 400 may include selecting food or drink items 402A, 402B, and 402C (collectively referred to as food or drink items 402), an item selection GUI 408, and an item purchase GUI 412. The food or drink items 402 may be provided, for example, by a display in the restaurant (e.g., a pepperoni pizza and a cheese pizza on display, either or both of which may indicated by the smart gesture 80), or by a sign or placard indicating a food or drink item 402. It should be noted that, while FIG. 13 and FIG. 14 describe a restaurant 400, this is merely exemplary, and the disclosed embodiments may also apply to a food court, cafeteria, canteen, or other similar premises.

Figure 14:
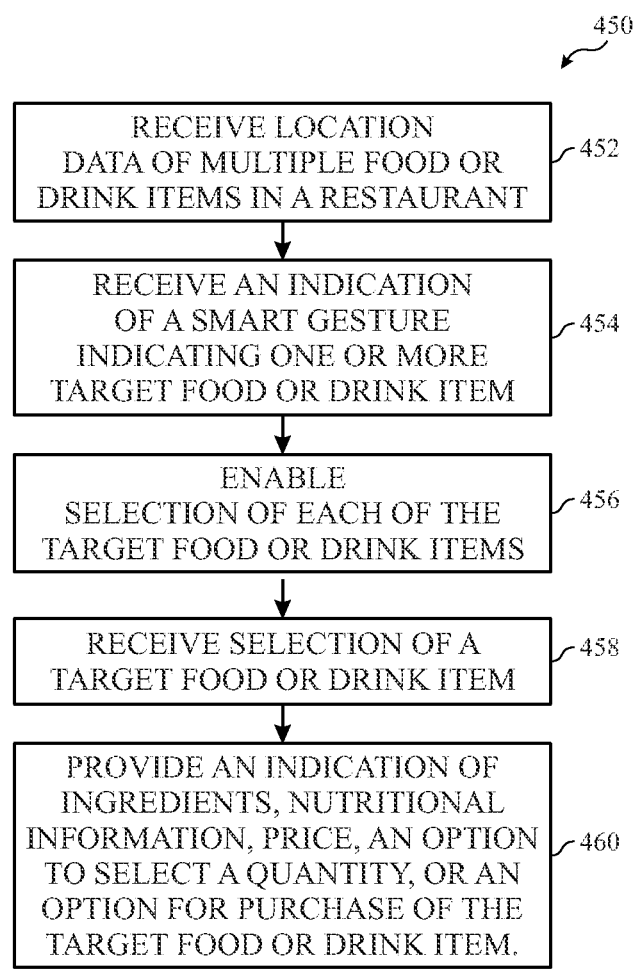
FIG. 14 is a flowchart of a method for selecting food or drink items in the smart gesture-enabled restaurant of FIG. 13, according to embodiments of the present disclosure.

FIG. 14 is a flowchart of a method 450 for selecting food or drink items 402 in a smart gesture enabled restaurant 400, according to an embodiment of the present disclosure. Any suitable device (e.g., a controller) that may control components of the electronic device 10, such as the processor 12, may perform the method 450. In some embodiments, the method 450 may be implemented by executing instructions stored in a tangible, non-transitory, computer-readable medium, such as the memory 14 or storage 16, using the processor 12. For example, the method 450 may be performed at least in part by one or more software components, such as an operating system of the electronic device 10, one or more software applications of the electronic device 10, and the like. While the method 450 is described using steps in a specific sequence, it should be understood that the present disclosure contemplates that the described steps may be performed in different sequences than the sequence illustrated, and certain described steps may be skipped or not performed altogether.

In process block 452, the electronic device 10 may receive location data of multiple food or drink items (e.g., items 402) in a restaurant, similarly to process block 102 of FIG. 4, process block 182 of FIG. 6, and process block 322 of FIG. 12, the location data being associated specifically with food or drink items in the restaurant. In process block 454, the electronic device 10 may receive an indication of a smart gesture 80 indicating one or more target food or drink items (e.g., 402A and 402B). For example, the smart gesture 80 may indicate one or more of the displays or placards indicating a food or drink item 402. The smart gesture 80 may indicate (e.g., via the extended vector 164 generated by the smart gesture 80 or via connecting to multiple beacon signals 204) more than one food or drink item 402, such as 402A and 402B shown in FIG. 13. Both food or drink items 402A and 402B may be indicated by the smart gesture 80, but food or drink item 402C may be a sufficient distance away from the area indicated by the smart gesture 80 (e.g., outside of the threshold range of the extended vector 164 our outside of the beacon radius 206) that it may not be identified as a targeted food or drink item. The threshold range may be 0 to 3 meters, 0 to 5 meters, 0 to 15, and so on. In process block 456, the electronic device 10 may enable selection of each of the target food or drink items 402A and 402B. The selection may be displayed by the item selection GUI 408 on the display 18. The item selection GUI 408 may provide a prompt to select one or more of the target food or drink items (e.g., 402A and 402B).

In process block 458, the electronic device 10 may receive selection of a target food or drink item of the target food or drink items 402A and 402B. This selection may be confirmed by selection of the "Apply" affordance 410. For example, in FIG. 13, the selection of the selected target food or drink item 402A may be confirmed, and thus may enable the electronic device 10 to proceed to the item purchase GUI 412, upon selection of the "Apply" affordance 410. This selection may be made in a variety of ways. In one embodiment, selection may be made by pressing the desired target food or drink item on a touchscreen-enabled display 18 of the electronic device 10. In an alternative embodiment, the selection may be made by providing voice input (e.g., speaking "select item number one," or "select soup") to a microphone of the electronic device 10 (e.g., a smart watch) or of a pair of headphones, earbuds, and so on. In an additional embodiment, the selection may be made by a gesture such as a head nod (e.g., to indicate affirmative input) or head shake (e.g., to indicate a negative input). The head nod may be detected by the motion sensors 60 within a pair of headphones, earbuds, or smart glasses. Further, any number of target food or drink items (e.g., 1 or more, 3 or more, 5 or more, 10 or more, and so on) may be provided in the item selection GUI 408, and any number of target food or drink items 402 may be selected. Or no items may be selected, in which case the "Cancel" affordance 409 may be selected, which may exit the item selection GUI 408.

In process block 460, the electronic device 10 may provide (e.g., via the display 18) information on the selected target food or drink item, such as an indication of ingredients, nutritional information (e.g., calorie count), price, estimated time until order is ready, an option to select a quantity, or an option for purchase of the selected target food or drink item 402A. Additionally or alternatively, the electronic device may compare the nutritional information with the nutritional information of food or drink consumed earlier, and provide a notification informing the user of whether or not the user is meeting a pre-determined health goal. This information may be displayed in the item purchase GUI 412. The item purchase GUI 412 may enable selection of ingredients (e.g., a selection to add or remove ingredients from an order) or quantity, or the option to purchase (e.g., using the "Add to Cart" affordance 414). The item purchase GUI 412 may receive selection similarly to the item selection GUI 408, as was previously discussed. Alternatively, no further selection may be made, and the order may be cancelled upon the item purchase GUI 412 receiving a selection of the "Cancel" affordance 409. As such, the method 450 may enable selecting food or drink items 402 in a smart gesture enabled restaurant 400, according to an embodiment of the present disclosure.

Figure 15:
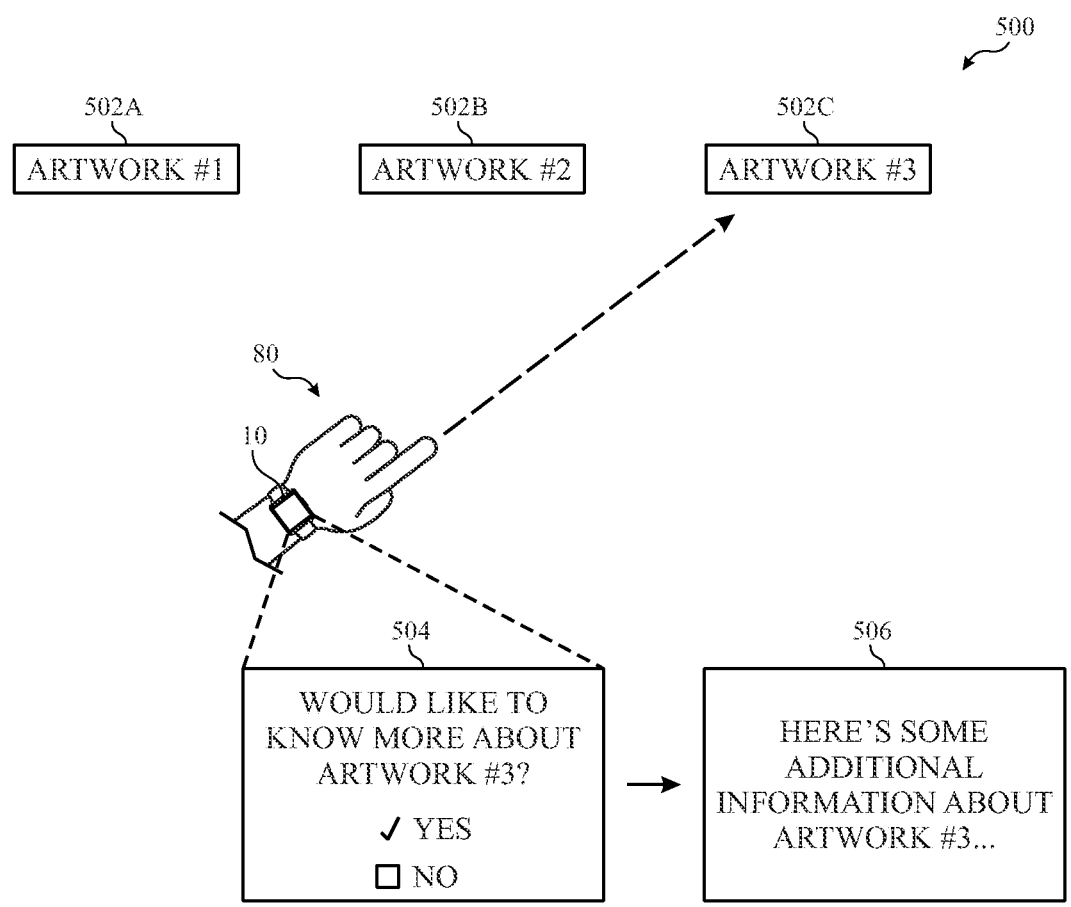
FIG. 15 is a perspective diagram of smart gesturing operation in a smart gesture-enabled art gallery, according to embodiments of the present disclosure.
Figure 16:
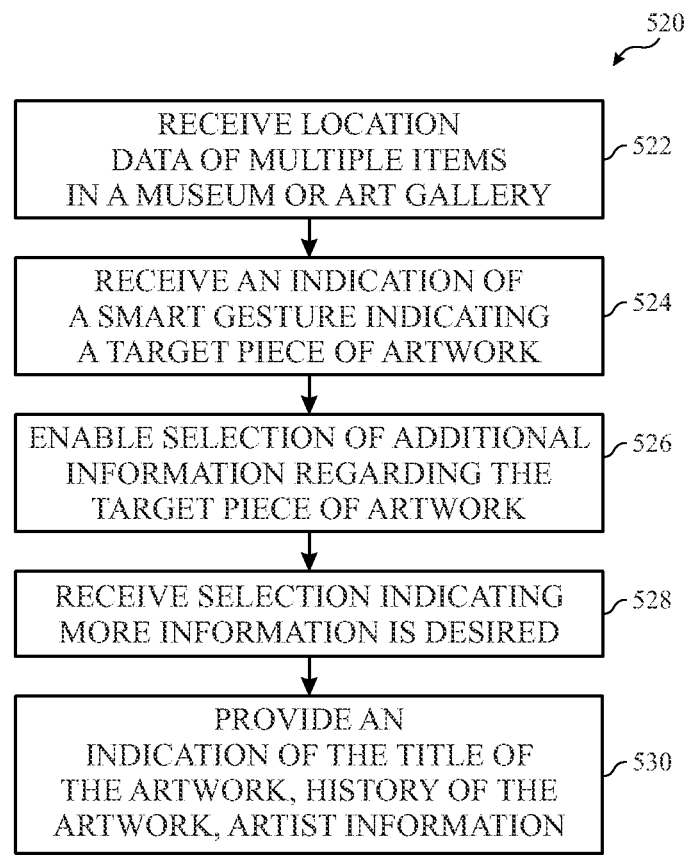
FIG. 16 is a flowchart of a method for facilitating smart gesturing in the smart gesture-enabled recreational premises, such as the smart-gesture enabled art gallery of FIG. 15, according to embodiments of the present disclosure.

FIG. 15 is a perspective diagram of smart gesturing operation in a smart gesture-enabled art gallery 500. The smart gesture enabled art gallery 500 may include various pieces of artwork such as artwork 502A, 502B, and 502C (collectively referred to as artwork 502). FIG. 16 is a flowchart of a method 520 for facilitating smart gesturing on a recreational premise such as an art gallery, according to an embodiment of the present disclosure. Any suitable device (e.g., a controller) that may control components of the electronic device 10, such as the processor 12, may perform the method 520. In some embodiments, the method 520 may be implemented by executing instructions stored in a tangible, non-transitory, computer-readable medium, such as the memory 14 or storage 16, using the processor 12. For example, the method 520 may be performed at least in part by one or more software components, such as an operating system of the electronic device 10, one or more software applications of the electronic device 10, and the like. While the method 520 is described using steps in a specific sequence, it should be understood that the present disclosure contemplates that the described steps may be performed in different sequences than the sequence illustrated, and certain described steps may be skipped or not performed altogether.

In process block 522 the electronic device 10 may receive location data of multiple items similarly to process block 102 of FIG. 4 and process block 452 in FIG. 14, the location data being associated specifically with items in an art gallery. In process block 524, the electronic device 10 may receive an indication of a gesture indicating a target piece of artwork, similarly to process block 104 in FIG. 4 and process block 454 in FIG. 14, the smart gesture 80 indicating a target piece of artwork (e.g., artwork 502C). In process block 526, the electronic device 10 may enable selection of additional information regarding the target artwork 502C. The electronic device 10 may enable selection via a selection GUI 504. The selection GUI 504 may include a prompt querying whether additional information on the target artwork 502C is desired, a "Yes" affordance and a "No" affordance. In process block 528, the electronic device 10 may receive a selection indicating more information on the target artwork 502C is desired. The selection may be made by the user selecting (via input structures 22) the "Yes" affordance or the "No" affordance within the selection GUI 504. As previously discussed, the selection may be made in a variety of ways. In one embodiment, the selection may be made by pressing the desired response to the prompt within selection GUI 504 on a touchscreen-enabled display 18 of the electronic device 10. In an alternative embodiment, the selection may be made by providing voice input (e.g., speaking "yes," or "yes I would like more information") to a microphone of the electronic device (e.g., a smart watch) or of a pair of headphones, earbuds, and so on. In an additional embodiment, the selection may be made by a gesture such as a head nod (e.g., to indicate affirmative input) or head shake (e.g., to indicate a negative input). The head nod may be detected by the motion sensors 60 within a pair of headphones, earbuds, or smart glasses.

In process block 530, in response to the electronic device 10 receiving an indication that more information on a piece of artwork (e.g., the target artwork 502C), the electronic device 10 may provide additional information on the piece of artwork via the GUI 506. The additional information may include the title of the artwork, history of the artwork, artist information, if the artwork is for sale, sale price, and so on. While a smart gesture-enabled art gallery has been discussed in FIGS. 15 and 16, this is merely exemplary, and the same methods may be applied in a museum or similar recreational premises. As such, the method 520 may enable smart gesturing in a smart gesture-enabled art gallery 500.

Figure 17:
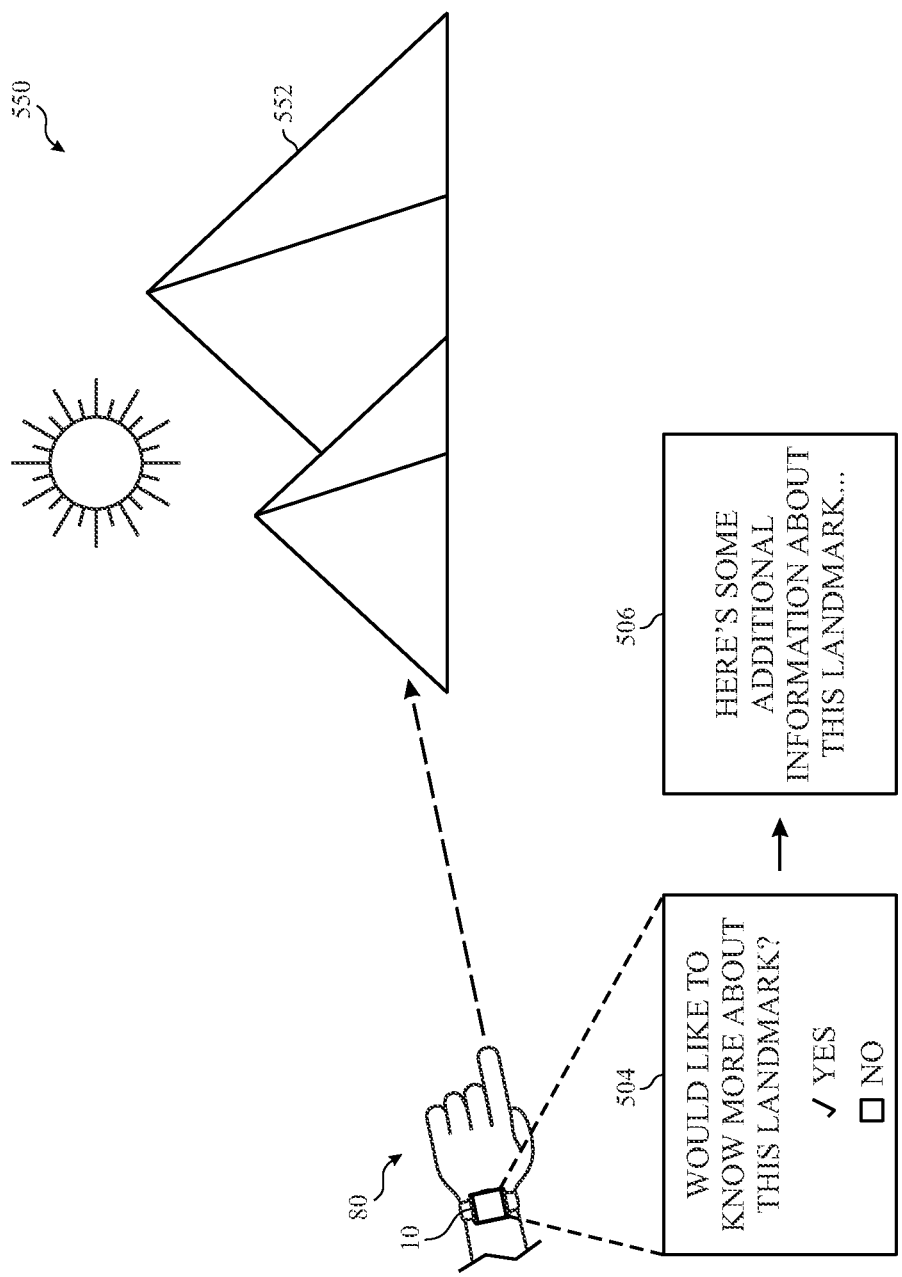
FIG. 17 is a perspective diagram of smart gesturing operation to facilitate information collection while sightseeing, according to embodiments of the present disclosure.
Figure 18:
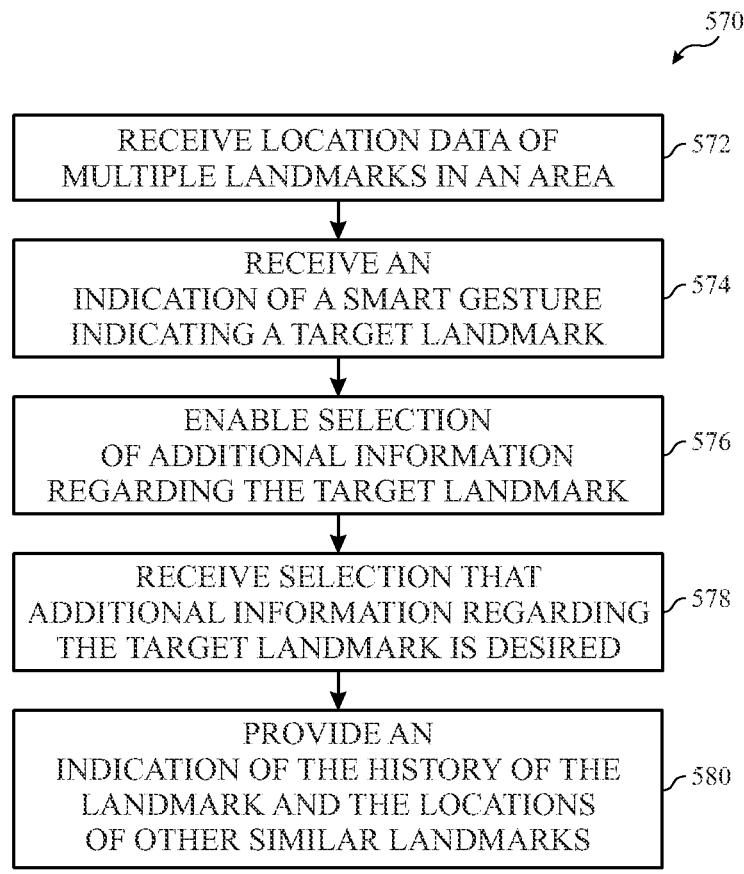
FIG. 18 is a flowchart of a method for enabling smart gesturing to facilitate the information collection of FIG. 17, according to embodiments of the present disclosure.

FIG. 17 is a perspective diagram of smart gesturing operation to facilitate information collection while sightseeing. FIG. 18 is a flowchart of a method 570 for enabling smart gesturing to facilitate data collection and enhance a sightseeing experience, according to an embodiment of the present disclosure. Any suitable device (e.g., a controller) that may control components of the electronic device 10, such as the processor 12, may perform the method 570. In some embodiments, the method 570 may be implemented by executing instructions stored in a tangible, non-transitory, computer-readable medium, such as the memory 14 or storage 16, using the processor 12. For example, the method 570 may be performed at least in part by one or more software components, such as an operating system of the electronic device 10, one or more software applications of the electronic device 10, and the like. While the method 570 is described using steps in a specific sequence, it should be understood that the present disclosure contemplates that the described steps may be performed in different sequences than the sequence illustrated, and certain described steps may be skipped or not performed altogether.

In process block 572, the electronic device 10 may receive location data of multiple landmarks or tourist attractions in an area, similarly to process blocks 102 and 522, in FIG. 4 and FIG. 16, respectively. In process block 574, the electronic device 10 may receive an indication of a smart gesture 80 indicating a target landmark 552, similarly to process blocks 104 and 524 in FIG. 4 and FIG. 16, respectively. In process block 576, the electronic device 10 may enable selection of additional information regarding the target landmark 552, similarly to process block 526 in FIG. 16. In process block 578, the electronic device 10 may receive a selection, via the selection GUI 504, that additional information regarding the target landmark 552 is desired, similarly to process block 528 in FIG. 16. In process block 580, the electronic device 10 may, in response to receiving a selection that additional information regarding the target landmark 552 is desired, provide an indication of the history of the target landmark 552, the location of similar landmarks, and so on. This additional information may be provided on the display 18 of the electronic device 10, such as in the GUI 506. As such, the method 570 may enable smart gesturing to facilitate data collection and enhance a sightseeing experience.

In an additional embodiment, smart gesturing may be used to facilitate and streamline the process of purchasing a vehicle. For example, an electronic device 10 at an automobile dealership may receive (via the receiver 54) location data for the vehicles in the dealership. The electronic device may receive an indication of a vehicle in the dealership using a smart gesture 80 and location data on the electronic device 10 received from a UWB anchor (e.g., 152). Via the display 18 and a GUI (e.g., selection GUI 504), the electronic device 10 may enable selection of additional information regarding the targeted vehicle. Upon receiving a selection indicating additional information on the vehicle is desired, the electronic device may provide the additional information, which may include the vehicle's make, model, price, whether the vehicle is new or used, warranty information, and so on. Further, the selection GUI 504 may provide customization options, such as two-wheel-drive or four-wheel-drive options, towing packages, stereo system packages, and/or other features and packages. The electronic device 10 may (via the transmitter 52) query a server to determine if a vehicle matching the features selected in the selection GUI 504 is available at the dealership or, if not, where a vehicle matching that description is available. Alternatively, smart vehicle shopping may be enabled via use of a UWB beacon (e.g., 202), wherein the electronic device 10 may identify the desired vehicle based on receiving a beacon signal 204 corresponding to a UWB beacon 202 associated with the desired vehicle, similarly to the method 220 in FIG. 8.

In another embodiment, smart gesturing may similarly be used to facilitate buying or renting a home. For example, a house that is for sale may have a UWB beacon 202 placed on or around the house (e.g., on the "for sale" sign). The electronic device 10 may receive an indication of a smart gesture 80 (e.g., via the motion sensors 60) targeting the UWB beacon 202 associated with the house, and receive (via a UWB receiver 64 or a UWB transceiver 66) a beacon signal 204 corresponding to the house that is for sale or for lease. The electronic device 10 may, via the display 18 and a GUI (e.g. the GUI 506) provide information on the house such as square footage, number of bedrooms, number of bathrooms, tax information, asking price, realtor or seller contact information, and so on.

In yet another embodiment, smart gesturing may be used to enhance a user's experience on a recreational premise such as a theme park. The electronic device 10 may receive location data of the various rides and/or attractions within the theme park. The electronic device 10 may receive an indication of a smart gesture 80 indicating a ride or attraction, and enable selection of additional information regarding the ride or attraction targeted by the smart gesture 80. The electronic device 10 may then receive a selection (e.g., via the selection GUI 504) indicating additional information on the ride or attraction is desired. In response to receiving the selection indication that additional information on the ride or attraction is desired, the electronic device 10 may provide (e.g., via the GUI 506) the additional information, such as height requirements, age recommendation for the ride or attraction, health warnings, estimated wait times, and so on.

In another embodiment, smart gesturing may be used to enhance a user's experience on a recreational premise such as a zoo or aquarium. Similarly to the smart gesturing operation in a theme park, an electronic device 10 may receive location data of the various animal habitats in a zoo or aquarium. The electronic device 10 may receive an indication of a smart gesture 80 indicating an animal's habitat, and enable selection of additional information regarding the animal or animals within the habitat targeted by the smart gesture 80. The electronic device 10 may then receive a selection (e.g., via the selection GUI 504) indicating additional information on the animal or animals is desired. In response to receiving the selection indicating that additional information on the animal or animals is desired, the electronic device 10 may provide the additional information (e.g., via the GUI 506), such as size of the animal, what regions the animal is native to, diet, and so on. The electronic device 10 may also provide an affordance that, when selected, may initiate an audio playback of the sounds made by the animal indicated by the smart gesture 80. The electronic device 10 may also provide a 3D model of the animal, which may be viewed in a 3D, 2D, or augmented reality environment, as previously discussed in FIG. 10.

Additionally or alternatively, smart gesturing operation within a theme park, zoo, or aquarium may use a UWB beacon system 200, where a placard or sign associated with a particular ride, attraction, or habitat may be within the beacon radius 206 of a UWB beacon 202. Upon receiving an indication of a smart gesture 80, the electronic device 10 may receive a beacon signal 204 associated with the UWB beacon 202, which may then cause the electronic device 10 to enable selection of additional information relating to the ride, attraction, or animal, as was discussed above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving location data corresponding to one or more items;
determining, via an electronic device, a gesture indicating a target item of the one or more items based on the location data;
displaying, based at least on the gesture, item information associated with the target item;
receiving an indication to purchase the target item at a checkout station; and
providing the item information and a path to the checkout station based on the indication.

2. The method of claim 1, wherein the item information comprises a price of the target item or a composition of the target item.

3. The method of claim 1, wherein the item information comprises a selectable affordance configured to enable selection of a quantity of the target item.

4. The method of claim 1, further comprising determining a second target item based at least on a virtual shopping list and providing a direction to the second target item.

5. The method of claim 4, wherein providing the direction to the second target item comprises providing a path to the second target item.

6. The method of claim 1, further comprising providing the item information via a graphical user interface (GUI) to enable purchase of the target item.

7. The method of claim 1, wherein determining, via the electronic device, the gesture indicating the target item comprises:
    determining a first location and a second location of the electronic device; and
    generating a vector based on the first location and the second location of the electronic device.

8. The method of claim 1, further comprising displaying, via a graphical user interface, a first selectable affordance associated with purchasing the item online and a second selectable affordance associated with purchasing an item at the checkout station.

9. The method of claim 8, wherein receiving the indication to purchase the target item at the checkout station is based on a selection of the second selectable affordance.

10. The method of claim 8, further comprising receiving an additional indication to have the target item delivered via an automated guided vehicle (AGV).

11. The method of claim 10, wherein the AGV delivers the target item to a location based on additional location data associated with the electronic device.

12. An electronic device, comprising:
    receive circuitry configured to receive location data corresponding to one or more items; and
    processing circuitry configured to:
        determine a gesture indicating a target item of the one or more items based at least partially on the location data;
        provide, based at least on the gesture, item information associated with the target item;
        provide, via a graphical user interface, a first selectable affordance associated with the target item and a second selectable affordance associated with a second target item;
        receive an indication to purchase the target item; and
        provide an interface to enable purchase of the target item based on the indication.

13. The electronic device of claim 12, wherein the processing circuitry is configured to determine the gesture indicating the target item based on receiving, via an ultra-wideband receiver of the electronic device, a beacon signal from an ultra-wideband beacon.

14. The electronic device of claim 12, wherein the processing circuitry is configured to enable, via interaction with the graphical user interface, selection of the target item via the first selectable affordance or selection of the second target item via the second selectable affordance.

15. The electronic device of claim 12, wherein the processing circuitry is configured to enable, via voice command, selection of the target item via the first selectable affordance or selection of the second target item via the second selectable affordance.

16. The electronic device of claim 12, wherein the processing circuitry is configured to determine the second target item and provide a direction to the second target item.

17. Tangible, non-transitory, computer-readable media, comprising computer-readable instructions that, upon execution by one or more processors of an electronic device, cause the one or more processors to:
    receive location data corresponding to one or more items;
    determine a gesture indicating a target item of the one or more items by determining a first location and a second location of the electronic device and generating a vector based on the first location and the second location of the electronic device;
    provide, based at least on the gesture, item information associated with the target item; and
    receive an indication to purchase the target item.

18. The tangible, non-transitory, computer-readable media of claim 17, wherein the instructions cause the one or more processors to provide, based at least on the gesture, the item information associated with the target item by providing a three-dimensional (3D) rendering of the target item in a virtual environment.

19. The tangible, non-transitory, computer-readable media of claim 17, wherein the instructions cause the one or more processors to determine the gesture indicating the target item by receiving, via an ultra-wideband receiver of the electronic device, a beacon signal from an ultra-wideband beacon.

20. The tangible, non-transitory, computer-readable media of claim 17, wherein the instructions cause the one or more processors to provide, based at least on the gesture, the item information associated with the target item by providing a three-dimensional (3D) rendering of the target item in an augmented reality environment.

* * * * *